US009045192B2

(12) United States Patent
   Schlanger

(10) Patent No.: US 9,045,192 B2
(45) Date of Patent: Jun. 2, 2015

(54) QUICK RELEASE HUB ASSEMBLY

(76) Inventor: Raphael Schlanger, Wilton, CT (US)

( * ) Notice: Subject to any disclaimer, the term of this patent is extended or adjusted under 35 U.S.C. 154(b) by 564 days.

(21) Appl. No.: 13/068,499

(22) Filed: May 12, 2011

(65) Prior Publication Data

US 2011/0278912 A1    Nov. 17, 2011

Related U.S. Application Data

(60) Provisional application No. 61/395,509, filed on May 14, 2010.

(51) Int. Cl.
  *B62K 25/02* (2006.01)
  *B60B 27/02* (2006.01)
(52) U.S. Cl.
  CPC ............... *B62K 25/02* (2013.01); *B60B 27/026* (2013.01); *B62K 2206/00* (2013.01)
(58) Field of Classification Search
  CPC ... B60B 27/026; B62K 25/02; B62K 2206/00
  USPC ............ 301/124.2, 110.5, 132; 280/279, 288; 403/374.1, 374.2, 374.3, 374.4, 374.5
  See application file for complete search history.

(56) References Cited

U.S. PATENT DOCUMENTS

| | | | | |
|---|---|---|---|---|
| 4,400,038 | A | * | 8/1983 | Hosokawa ................. 301/124.2 |
| 4,805,941 | A | * | 2/1989 | Downing et al. ............. 280/279 |
| 5,673,925 | A | * | 10/1997 | Stewart ........................ 280/279 |
| 6,241,322 | B1 | * | 6/2001 | Phillips ...................... 301/124.2 |
| 7,530,645 | B2 | * | 5/2009 | Takachi ..................... 301/124.2 |
| 7,648,211 | B2 | * | 1/2010 | Watarai ...................... 301/110.5 |
| 7,661,767 | B2 | * | 2/2010 | Montague et al. ......... 301/124.2 |
| 7,722,129 | B2 | * | 5/2010 | Cusack ...................... 301/124.2 |
| 8,267,484 | B2 | * | 9/2012 | Lude ......................... 301/124.2 |
| 2007/0154286 | A1 | * | 7/2007 | Spahr ............................. 411/402 |
| 2008/0197600 | A1 | * | 8/2008 | Watarai ......................... 280/279 |
| 2009/0072613 | A1 | * | 3/2009 | Inoue et al. .................... 301/132 |

FOREIGN PATENT DOCUMENTS

WO    WO 2008/101593    * 8/2008

* cited by examiner

*Primary Examiner* — Kip T Kotter
*Assistant Examiner* — Jean Charleston

(57) ABSTRACT

A quick release hub assembly, comprising a stationary axle element with a first outer face and an axially opposed second outer face and an opening that extends axially between the first outer face and the second outer face, a rotatable hub shell element that is rotatable about the axle element and a quick release skewer assembly that includes a first skewer element with a first gripping face and a first collar portion extending axially inboard of the gripping face and a second skewer element with a second gripping face and a skewer shaft connecting the first skewer element and the second skewer element. The first gripping face is axially opposed and facing the second gripping face and the axial distance between the first gripping face and the second gripping face is selectively variable. The first gripping face is axially outboard the first outer face and the second gripping face is axially outboard the second outer face and the quick release skewer assembly extends through the opening. The first skewer element is connected to the skewer shaft by means of a connection at a location that is axially inboard of the first gripping face. Preferably including a frame with a frame element with first and second mounting portions, where the first collar portion includes locating geometry to provide radially positioning alignment with the first mounting portion.

46 Claims, 15 Drawing Sheets

QUICK RELEASE HUB ASSEMBLY

CROSS-REFERENCE TO RELATED APPLICATION

This application claims priority of U.S. provisional patent application 61/395,509, filed May 14, 2010, and entitled "QUICK RELEASE HUB ASSEMBLY".

BACKGROUND

1. Field of the Invention

The present invention relates to the quick release hub assembly that facilitates the connection between axle of a vehicle wheel and the frame to which the vehicle wheel is mounted.

2. Discussion of Prior Art

Heretofore, the prior art quick release skewer nut is a large and bulky component with correspondingly high aerodynamic drag, heavy weight and poor aesthetics. Prior art skewer nuts generally project very far from the outer face of the dropout, usually projecting a distance of 0.6" to 0.8". For proper function of the skewer nut, it must maintain a large helical thread engagement length with the skewer shaft, particularly if the skewer nut is made of a lighter softer material such as aluminum. Since this thread engagement is conventionally outboard of the outer face of the dropout, in order to maintain the requisite thread engagement, the nut has to project this large distance. Further, since the skewer nut is so tall, the skewer nut is also rather heavy. Still further, since this skewer nut projects so far from the dropout, it has lends poor aesthetics and increased aerodynamic drag to the hub assembly.

Similarly, the connection between the lever pivot of the clamping assembly and the skewer shaft is commonly outboard of the outer face of the dropout. Similar to the skewer nut, this requires that the clamping assembly project very far from the dropout. Thus, it may be seen that the conventional clamping assembly is also heavy, with poor aesthetics and increased aerodynamic drag.

SUMMARY OF THE INVENTION

Objects and Advantages

In accordance with the present invention, it has now been found that the forgoing objects and advantages may be readily obtained.

It is an objection of the invention to provide a quick release hub assembly that is low profile, aesthetically pleasing, aerodynamic and lightweight. A further object of the invention is its compatibility with existing frame designs.

Since an engagement between the skewer nut and the skewer shaft no longer needs to be axially outboard of the dropout, the present invention permits the design of a low profile skewer nut that has minimal outboard protrusion from its associated outer dropout face. The resulting design results in a more compact assembly that is more aesthetically pleasing. Further, this minimal outboard protrusion results in reduced aerodynamic drag as compared to prior art designs.

The present invention also permits a longitudinal engagement between the skewer nut (i.e. piloting nut) and/or the clamping assembly and the skewer shaft. This longitudinal engagement may be axially coincident and/or axially inboard of the dropout. The longitudinal length of this engagement may then be substantial enough to support the clamping loads in the skewer assembly. This is in contrast to prior art quick release skewer assemblies that rely on a longitudinal (i.e. threaded) engagement that is axially outboard of the dropout.

Still further, in comparison with prior art designs, the conventional axle stub is eliminated, the skewer shaft may be shortened and the skewer nut has reduced dimension. Thus, the compact design of the present invention may result in a result in reduced overall weight of the assembly, which is a very important benefit to cyclists.

Yet further, the present invention does not necessarily require modification to the frame and dropout design, which has the added benefit of permitting the frame to have compatibility both with the present invention and with conventional quick release hubs. This is important as the present invention may be retrofitted to the vast installed base of pre-existing conventional bicycle frames and does not require frame makers to make design modifications to new bicycle frames.

Further objects and advantages of my invention will become apparent from considering the drawings and ensuing description.

BRIEF DESCRIPTION OF THE DRAWINGS

The present invention will be more readily understandable from a consideration of the accompanying drawings, wherein:

FIG. 2b shows the quick release skewer assembly pre-assembled to the hub assembly prior to its mounting in the dropouts;

FIG. 2c shows the hub assembly positioned between the frame dropouts, with the quick release skewer assembly loosely adjusted and the lever in the "open" position;

FIG. 2d shows the hub assembly positioned between the frame dropouts with the quick release skewer assembly properly adjusted and the lever in the "closed" position to clamp the hub assembly with the dropouts;

FIG. 2e is an exploded view showing the hub assembly and quick release skewer assembly prior to their assembly;

FIG. 2f shows a sequence identical to FIG. 2b, with the quick release skewer assembly pre-assembled to the hub assembly prior to its mounting in the dropouts;

FIG. 2g shows a sequence identical to FIG. 2c, with the hub assembly positioned between the frame dropouts and with the quick release skewer assembly loosely adjusted and the lever in the "open" position;

FIG. 2h shows a sequence identical to FIG. 2d, with the hub assembly positioned between the frame dropouts and with the quick release skewer assembly properly adjusted and the lever in the "closed" position to clamp the hub assembly with the dropouts;

FIG. 3b shows the quick release skewer assembly pre-assembled to the hub assembly prior to its mounting in the dropouts;

FIG. 3c shows the hub assembly positioned between the frame dropouts, with the quick release skewer assembly loosely adjusted and the lever in the "open" position;

FIG. 3d shows the hub assembly positioned between the frame dropouts with the quick release skewer assembly properly adjusted and the lever in the "closed" position to clamp the hub assembly with the dropouts;

FIG. 3e is an exploded view showing the hub assembly and quick release skewer assembly prior to their assembly with the clamping assembly in partial cross section;

FIG. 3f shows a sequence identical to FIG. 3b, with the quick release skewer assembly pre-assembled to the hub assembly prior to its mounting in the dropouts;

FIG. 3g shows a sequence identical to FIG. 3c, with the hub assembly positioned between the frame dropouts and with the quick release skewer assembly loosely adjusted and the lever in the "open" position;

FIG. 3h shows a sequence identical to FIG. 3d, with the clamping assembly shown without cross section, with the hub assembly positioned between the frame dropouts and with the quick release skewer assembly properly adjusted and the lever in the "closed" position to clamp the hub assembly with the dropouts;

DETAILED DESCRIPTION OF THE INVENTION

Figure 1:
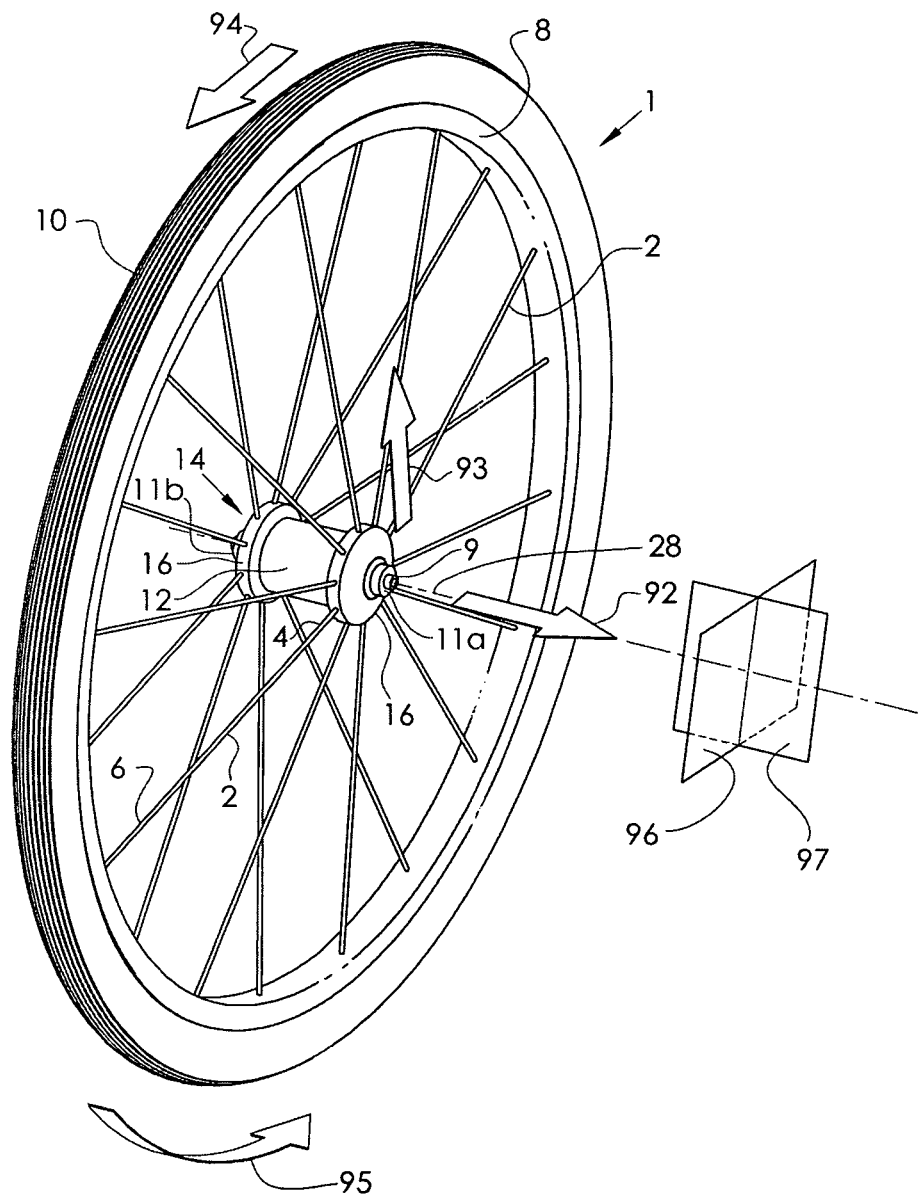
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. For clarity, the frame and the quick release skewer assembly are not shown in this figure. The hub shell 14 is rotatable about the axle 9 and includes at least two axially spaced hub flanges 16, each of which include a means for connecting with the spokes 2. Axle 9 includes end faces 11a and 11b that define the spacing of its mounting with the frame (not shown). The axial axis 28 is the axial centerline of rotation of the bicycle wheel 1. The hub flange 16 may be contiguous with the hub shell 14 or it may be separately formed and assembled to the hub body 12 portion of the hub shell 14. The spokes 2 are affixed to the hub flange 16 at their first end 4 and extend to attach the rim 8 at their second end 6. The tire 10 is fitted to the outer periphery of the rim 8. The wheel of FIG. 1 is generic and may be of tension-spoke or compression-spoke design.

The axial direction 92 is any direction parallel with the axial axis 28. The radial direction 93 is a direction generally perpendicular to the axial direction 92 and extending generally from the axial axis 28 radially outwardly toward the rim 8. The tangential direction 94 is a direction generally tangent to the rim at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 97 is a plane that is generally parallel to the axial axis. An axially inboard (or inward) orientation is an orientation that is axially proximal to the axial midpoint between the two end faces 11a and 11b. Conversely, an axially outboard (or outward) orientation is an orientation that is axially distal to the axial midpoint between the two end faces 11a and 11b. A radially inboard orientation is an orientation that is radially proximal to the axial axis 28 and a radially outboard orientation is an orientation that is radially distal to the axial axis 28. An axially inwardly facing surface is a surface that faces toward the axial midpoint between the two end faces 11a and 11b. Conversely, an axially outwardly fading surface is a surface that faces away from the axial midpoint between the two end faces 11a and 11b.

While it is most common for the hub shell 14 to rotate about a fixed axle 9, there are some cases where it is desirable to permit the axle 9 to be fixed with the wheel 1 such as the case where the wheel 1 is driven by the axle 9.

For general definition purposes herein, an "integral" joinder is one that is integrated and may not be easily disassembled at the service temperature without damaging at least one of the components that are joined or is difficult to disassemble or is otherwise not meant to be disassembled. This integral joinder involves a joining interface directly between two components. This joining interface is often a welded or adhered interface or some other interface where the two joining surfaces are solidly joined to each other to create a unified structure. Preferably this joining interface is a surface interface, rather than a point interface. The integral joinder is in contrast to a fastened joinder, where such a fastened joinder relies solely on a mechanically interlocked engagement to secure or connect the two components to each other. The term "integral" refers to two portions that are unitary, monolithic and/or integrally joined. Further, when two portions are considered "integral" with each other, they may be integrally joined or may be monolithic or otherwise combined as a singular element.

FIGS. 2a-h show a typical prior art quick release hub assembly 30, with dropouts 32a and 32b and quick release skewer assembly 34. The dropouts 32a and 32b may be considered mounting portions and constitute the portion of the frame (not shown) to which the hub assembly 30 is mounted or connected. Dropout 32a includes open slot 36a, axially inboard face 38a, and axially outboard face 40a. Similarly, dropout 32b includes open slot 36b, axially inboard face 38b, and axially outboard face 40b. Inboard faces 38a and 38b are axially opposed and face each other, while outer faces 40a and 40b are axially opposed and face away from each other. The dropouts 32a and 32b shown here are more typical of the front dropouts of a bicycle frame, but the rear dropouts are similar in design and it is understood that this design is representative of a wide range of dropout designs, either conventional or unconventional.

The hub assembly 30 includes an axle assembly 44 and a hub shell 14 and hub flanges 16a and 16b. In this case, the axle assembly 44 is generally stationary and fixed to the frame of the bicycle, while the hub shell 14 is rotatable about the axle assembly 44 by means of bearing assemblies (visible in FIGS. 2e-h) about axial axis 28. The hub shell 14 includes two hub flanges 16a and 16b that are adapted to connect with the inner ends of spokes (not shown). The axle assembly 44 includes axlecaps 42a and 42b. Axlecap 42a includes outer face 46a, axle stub 48a and axially extending through hole 50a. Similarly, axlecap 42b includes outer face 46b, axle stub 48b and axially extending through hole 50b. Outer faces 46a and 46b are generally axially opposed and face away from each other. Holes 50a and 50b constitute the exposed openings of a continuous axial hole that extends through the axle assembly 44 to accept the skewer shaft 52 of the quick release skewer assembly 34.

The quick release skewer assembly 34 includes skewer shaft 52, adjusting nut 62, cam-actuated clamping assembly 58 and springs 80a and 80b. Skewer shaft 52 includes a male threaded portion 54 at its adjustable end 56 and is fixed to the barrel nut 74 of the clamping assembly 58 at its clamping end 60. Springs 80a and 80b are compression springs, commonly in conical configuration, which permits the coils to overlap each other upon compression. Adjusting nut 62 includes an internally threaded hole 64 to threadably mate with threaded portion 54, a knurled surface 66 to facilitate its manual manipulation and an axially inward-facing gripping face 68 to bear against the outer face 40a of dropout 32a. Clamping assembly 58 includes a lever 70 with a cam surface 72 that rotates about a barrel nut 74 and a follower bushing 76 with a follower surface 77 and an axially inward-facing gripping face 78. As the lever 70 is rotated about the barrel nut 74, the cam surface 72 cams against the follower surface 77, causing the follower bushing 76 to be selectively displaced in the axial direction such that the grip face 78 is axially moveable relative to the barrel nut 74 and its associated skewer shaft 52. Thus, it may be seen that the quick release skewer assembly 34 has two modes to adjust the axial separation of gripping faces 68 and 78: (i) the threadable engagement between threaded portion 54 and threaded hole 64 and (ii) the camming interface between the cam surface 72 and follower surface 77.

Figure 2A:
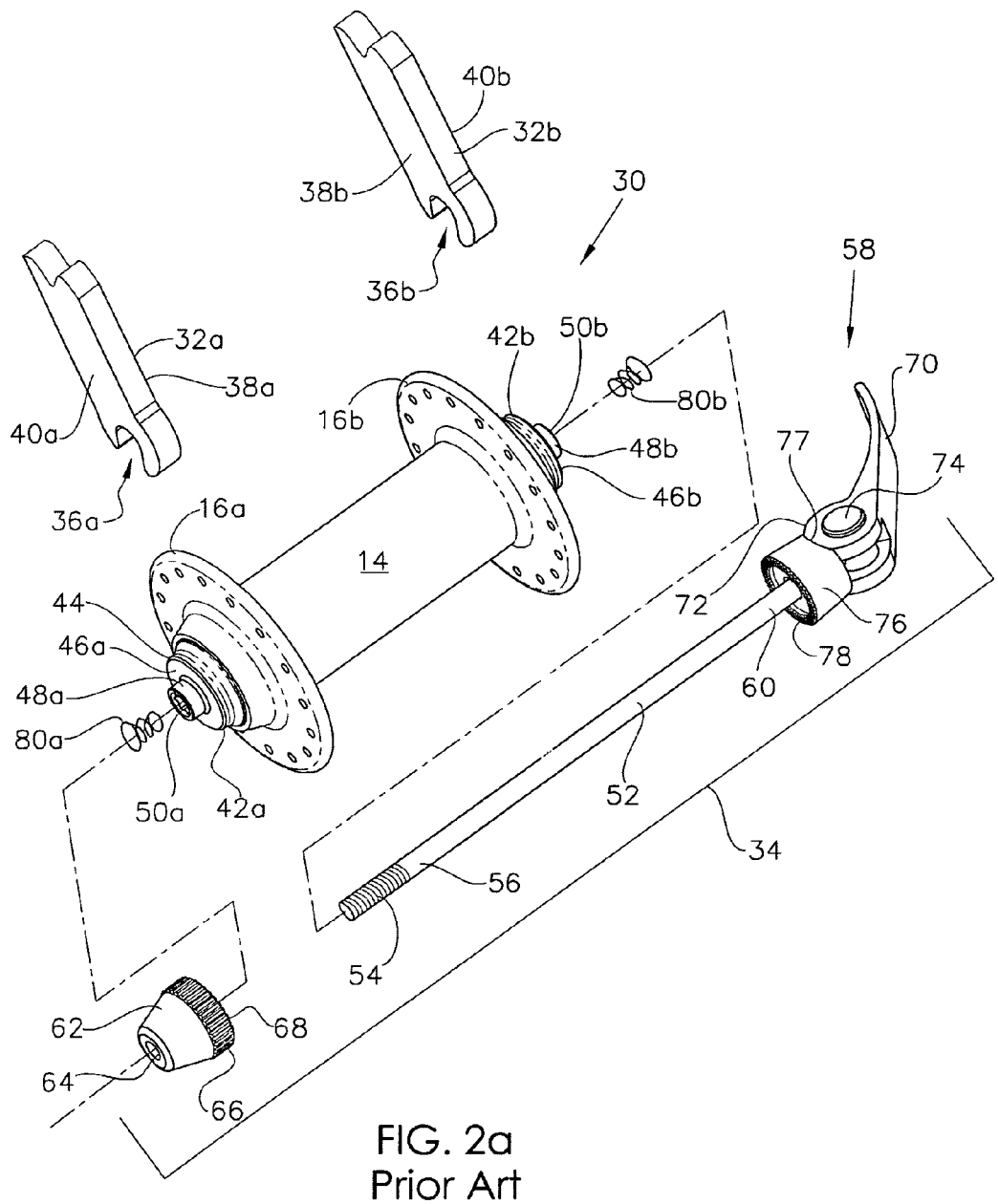
FIG. 2a is an exploded perspective view of a prior art hub assembly, including the dropouts of a frame and a conventional quick release skewer assembly.
Figure 2B:
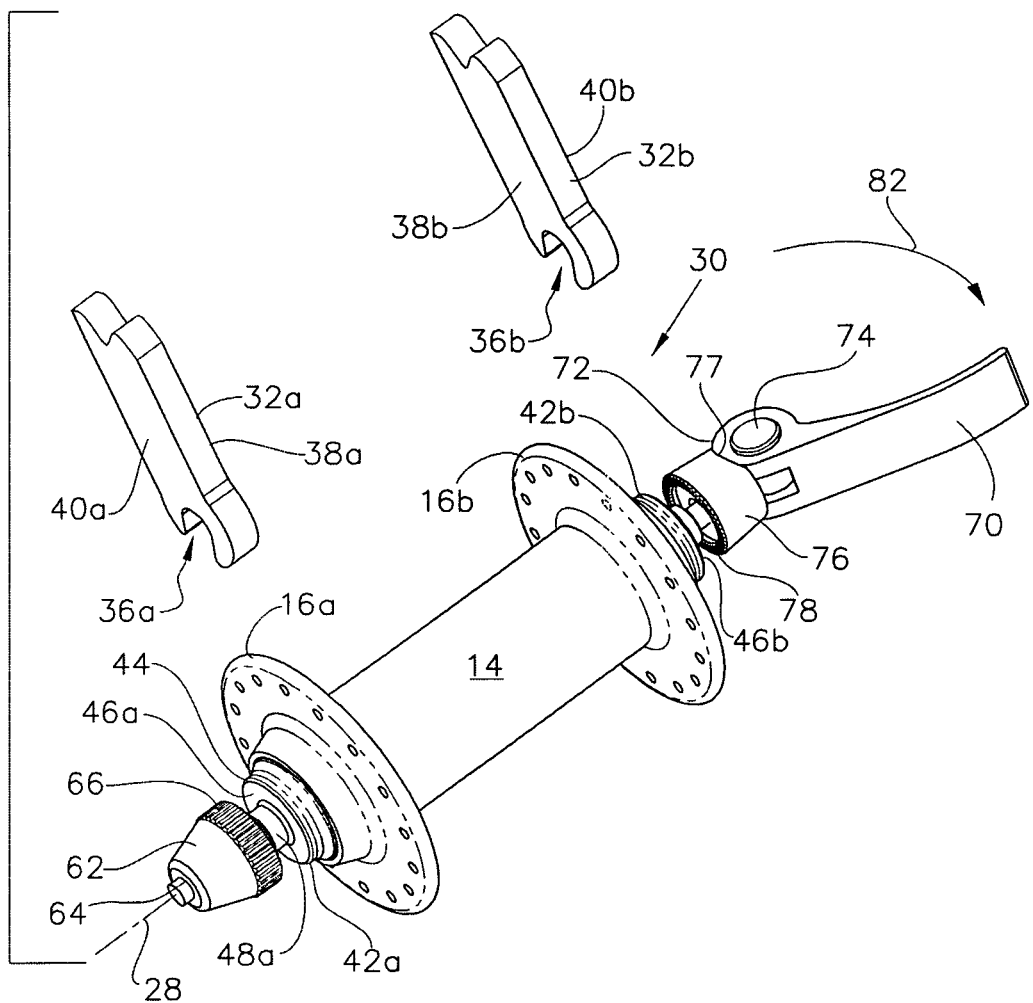
FIGS. 2b-d are exploded perspective views of the embodiment of FIG. 2a, showing the progressive sequential steps involved in mounting the hub assembly to the frame.

FIG. 2a shows the components of the hub assembly 30, quick release skewer assembly 34, and dropouts 32a and 32b in exploded view for clarity. FIG. 2b shows the quick release skewer assembly 34 as pre-assembled to the hub assembly 30. Please refer to FIGS. 2e-h for items described but not otherwise shown in FIGS. 2a-d. The skewer shaft 52 is first passed through the spring 80b and through hole 50b such that its adjustable end 56 extends through hole 50a. The spring 80a is then assembled over the exposed adjustable end 56 of skewer shaft 52 and adjusting nut 62 is loosely threaded onto the exposed end of skewer shaft 52, with threaded hole 64 threadably engaged with threaded portion 54. The hub assembly 30 is aligned with dropouts 32a and 32b such that inboard face 38a is axially aligned with outer face 46a and inboard face 38b is axially aligned with outer face 46b. The lever 70 is moved in direction 82 into the "open" position, such that the cam interface between cam surface 72 and follower bushing 76 is in the retracted position to provide maximum axial separation between gripping faces 68 and 78. Springs 80a and 80b serve to bias the adjusting nut 62 and the follower bushing 76 in their axially separated and spread position relative to outer faces 46a and 46b respectively and to maintain an open gap therebetween.

Figure 2C:
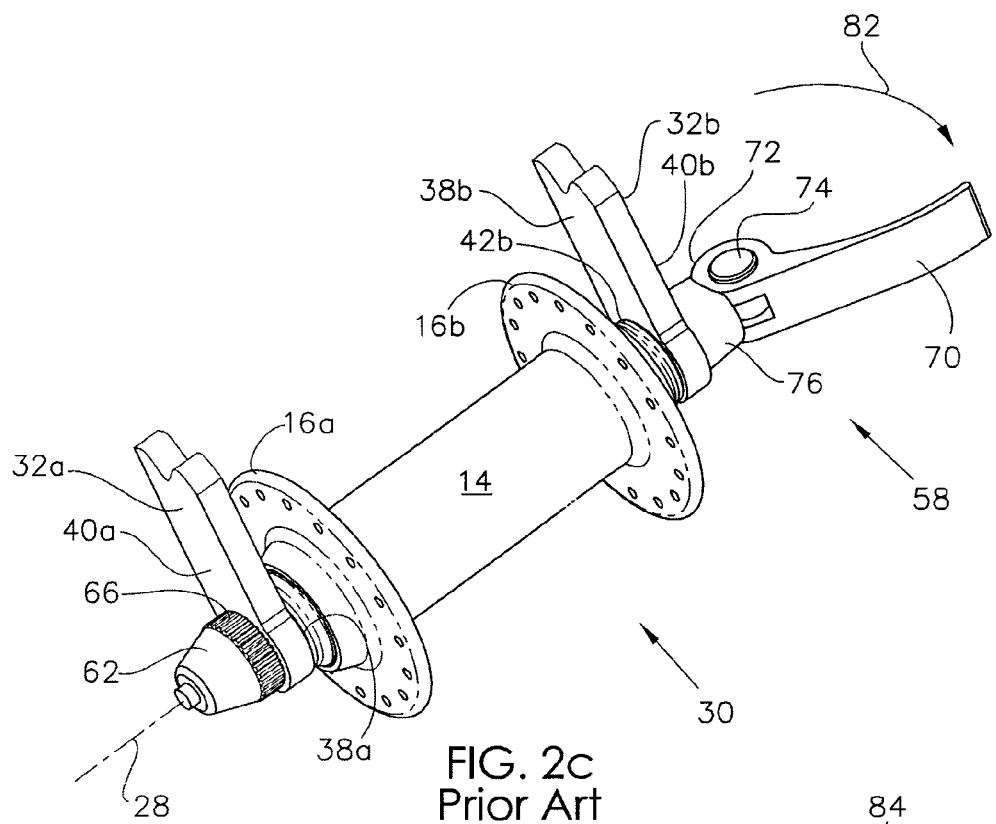

FIG. 2c shows the hub assembly 30 as pre-assembled and positioned within the dropouts 32a and 32b. Axle stubs 48a and 48b are now nested within slots 36a and 36b respectively to provide radial positioning alignment between the hub assembly 30 and the dropouts 32a and 32b. Also, inboard faces 38a and 38b are now loosely contacting outer faces 46a and 46b respectively. The adjusting nut 62 is then adjusted relative to the skewer shaft 52 by means of the threadable engagement between threaded portion 54 and threaded hole 64 such that the axial separation between gripping faces 68 and 78 is set to the desired distance. The lever 70 is still shown in the "open" position.

Figure 2D:
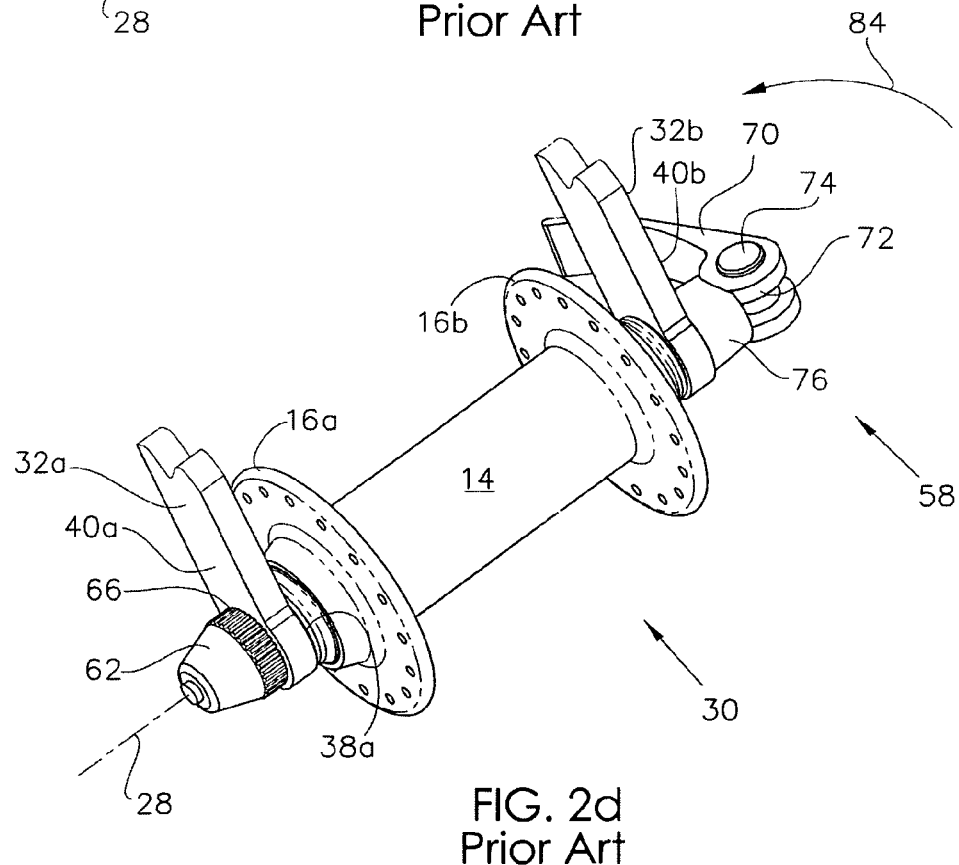

Next, as shown in FIG. 2d, the lever 70 is moved in direction 84 into the "closed" position, such that the cam interface between cam surface 72 and follower surface 77 of the follower bushing 76 is in the extended position to bias gripping faces 68 and 78 axially toward each other via the skewer shaft 52. Gripping face 68 is thereby pressed and clamped against outboard face 40a, and inboard face 38a is also pressed and clamped against outer face 46a. Simultaneously, gripping face 78 is now pressed and clamped against outboard face 40b, and inboard face 38b is also pressed and clamped against outer face 46b. Thus, dropout 32a is now sandwiched and clamped between gripping face 68 and outer face 46a and dropout 32b is now sandwiched and clamped between gripping face 78 and outer face 46b. The hub assembly 30 is now firmly assembled to both dropouts 32a and 32b.

Figure 2E:
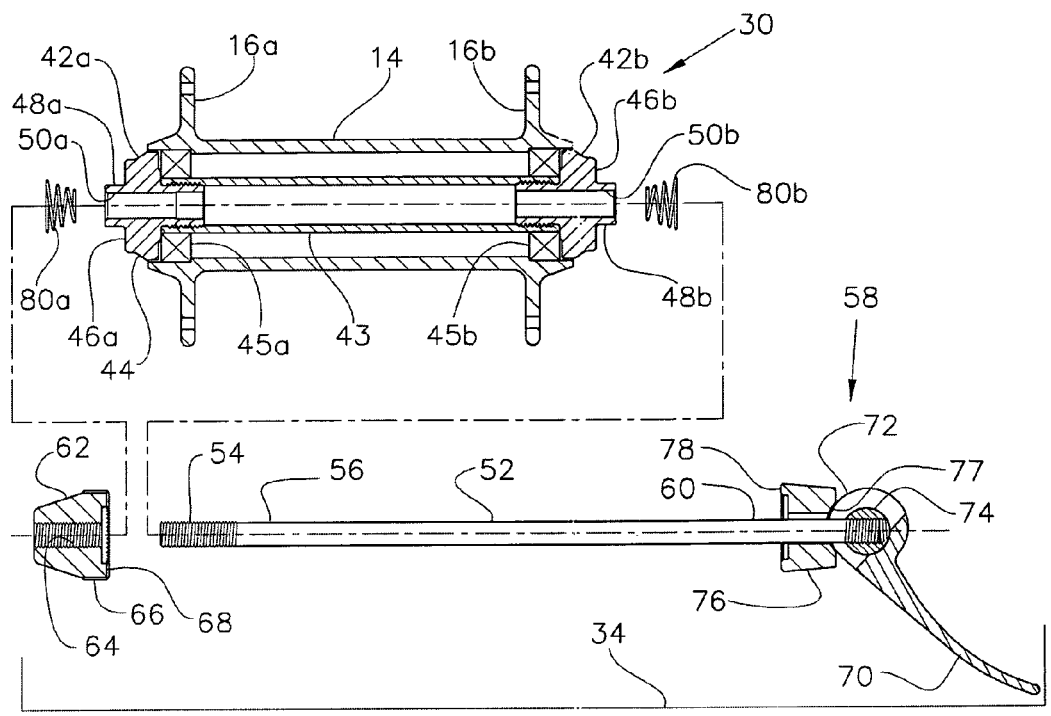
FIGS. 2e-h are axial cross-sectional views of the embodiment of FIG. 2a, showing the progressive sequential steps involved in mounting the hub assembly to the frame.

FIG. 2e corresponds to FIG. 2a and shows the hub assembly 30 and skewer assembly 34 in cross section for further clarity. It is shown that the axle assembly 44 is made up of axlecaps 42a and 42b and axle 43. Hub shell 14 is rotatable about the axle assembly 44 via bearing assemblies 45a and 45b.

Figure 2F:
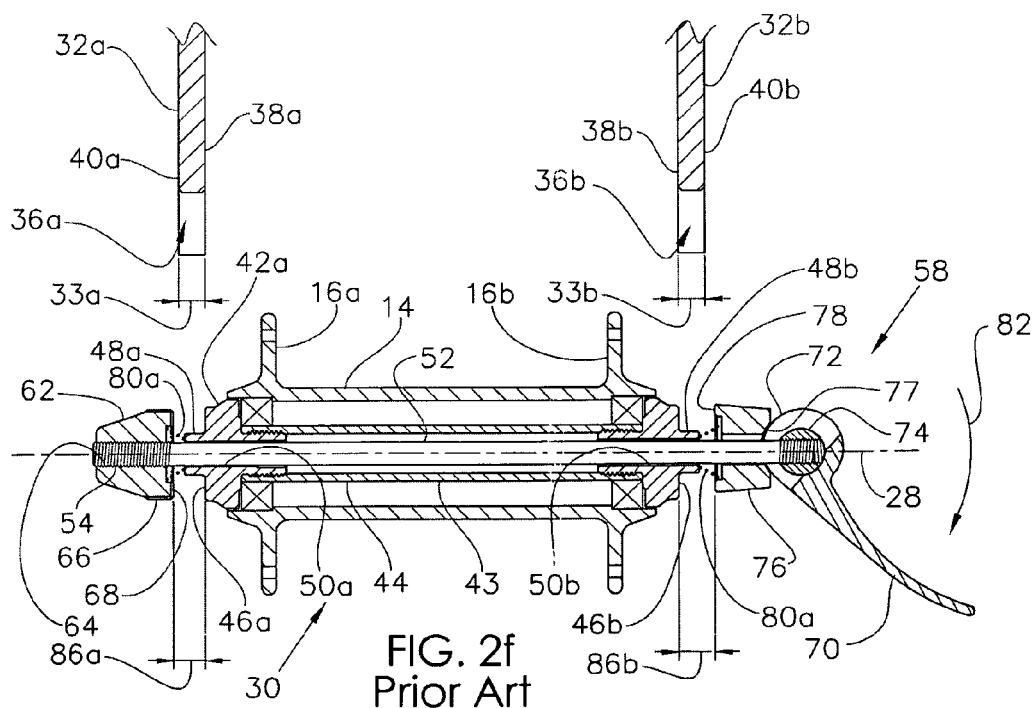

FIG. 2f corresponds to FIG. 2b and shows the hub assembly 30, skewer assembly 34, and dropouts in cross section for further clarity. Dropouts 32a and 32b have axial thickness 33a and 33b respectively. Similarly, gap 86a exists between gripping face 68 and outer face 46a and gap 86b exists between gripping face 78 and outer face 46b. In this figure, with the lever 70 in the "open" position, gaps 86a and 86b are shown in their open and expanded position such that gap 86a is greater than thickness 33a and gap 86b is greater than thickness 33b.

Figure 2G:
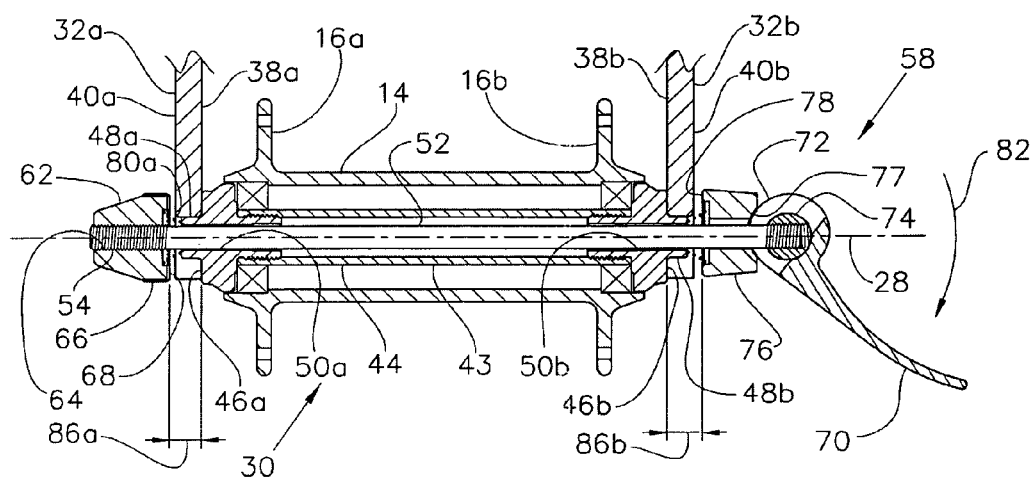

FIG. 2g corresponds to FIG. 2c and shows the hub assembly 30, skewer assembly 34, and dropouts in cross section for further clarity. Axle stubs 48a and 48b are now nested within slots 36a and 36b respectively to provide radial positioning alignment between the hub assembly 30 and the dropouts 32a and 32b. Lever 70 is still in the "open" position and inboard faces 38a and 38b are now loosely contacting outer faces 46a and 46b respectively. Also axial clearance exists between gripping face 68 and outboard face 40a and between gripping face 78 and outboard face 40b.

Figure 2H:
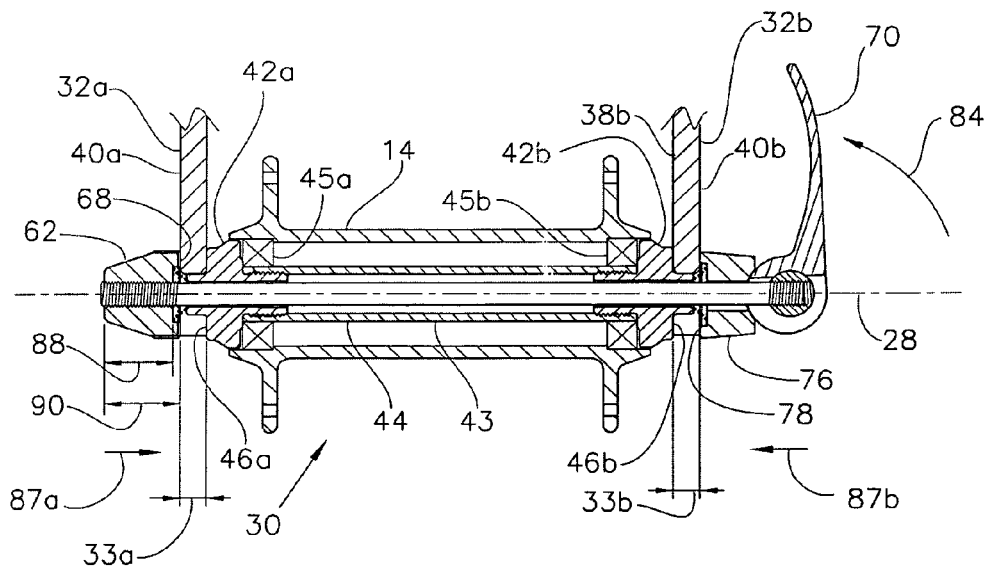

FIG. 2h corresponds to FIG. 2d and shows the hub assembly 30, skewer assembly 34, and dropouts in cross section for further clarity. Lever 70 is now moved in direction 84 into the "closed" position such that cam surface 72 cams against follower surface 77 to displace follower bushing 76 in direction 87b and adjusting nut 62 in direction 87a (by means of skewer shaft 52). Gaps 86a and 86b are thus reduced such that gripping face 68 is now pressed and clamped against outboard face 40a, and inboard face 38a is also pressed and clamped against outer face 46a. Simultaneously, gripping face 78 is now pressed and clamped against outboard face 40b, and inboard face 38b is also pressed and clamped against outer face 46b. Thus, dropout 32a is now sandwiched and clamped between gripping face 68 and outboard face 40a and dropout 32b is now sandwiched and clamped between gripping face 78 and outboard face 40b.

It should be noted that the threaded engagement between the threaded portion 54 of the skewer shaft 52 and the threaded hole 64 of the adjusting nut 62 is located entirely axially outboard of the outboard surface 40a of the dropout 32a. A certain minimum thread engagement length 88 is necessary to prevent stripping and/or damage to this threaded engagement under clamping load. Since this thread engagement length 88 is located outboard of the outboard surface 40a, the axial width 90 of the adjusting nut 62 must be substantial and, at minimum, correspond to the thread engagement length 88. Thus, with such prior art designs, the width 90 must protrude from the outboard surface 40a by a large dimension, which is typically around 20 mm, which results in increased weight and aerodynamic drag. Further, this bulky protrusion is aesthetically unappealing.

It should also be noted that the radial locating and alignment of the hub assembly 30 and quick release skewer assembly 34 is provided by the nested radial engagement between the axle stubs 48a and 48b and the slots 36a and 36b respectively. These axle stubs 48a and 48b are an integral part of the axle assembly 44 and extend axially outwardly from their respective outer faces 46a and 46b. It is noted that none of the components of the quick release skewer assembly 34 provide such radial locating and alignment means.

FIGS. 3a-h show a first embodiment of the present invention with quick release hub assembly 130, dropouts 32a and 32b, and quick release skewer assembly 134. The dropouts 32a and 32b are identical with those of FIGS. 2a-h and constitute the portion of the frame (not shown) to which the hub assembly 130 is mounted or connected. Dropout 32a includes open slot 36a, inboard face 38a, and outboard face 40a. Similarly, dropout 32b includes open slot 36b, inboard face 38b, and outboard face 40b. Inboard faces 38a and 38b are axially inwardly opposed and face each other, while outer faces 40a and 40b are axially outwardly opposed and face away from each other. The dropouts 32a and 32b shown here are more typical of the front dropouts of a bicycle frame, but the rear dropouts are similar in design and it is understood that this design is merely representative of a wide range of dropout designs, either conventional or unconventional.

Figure 3A:
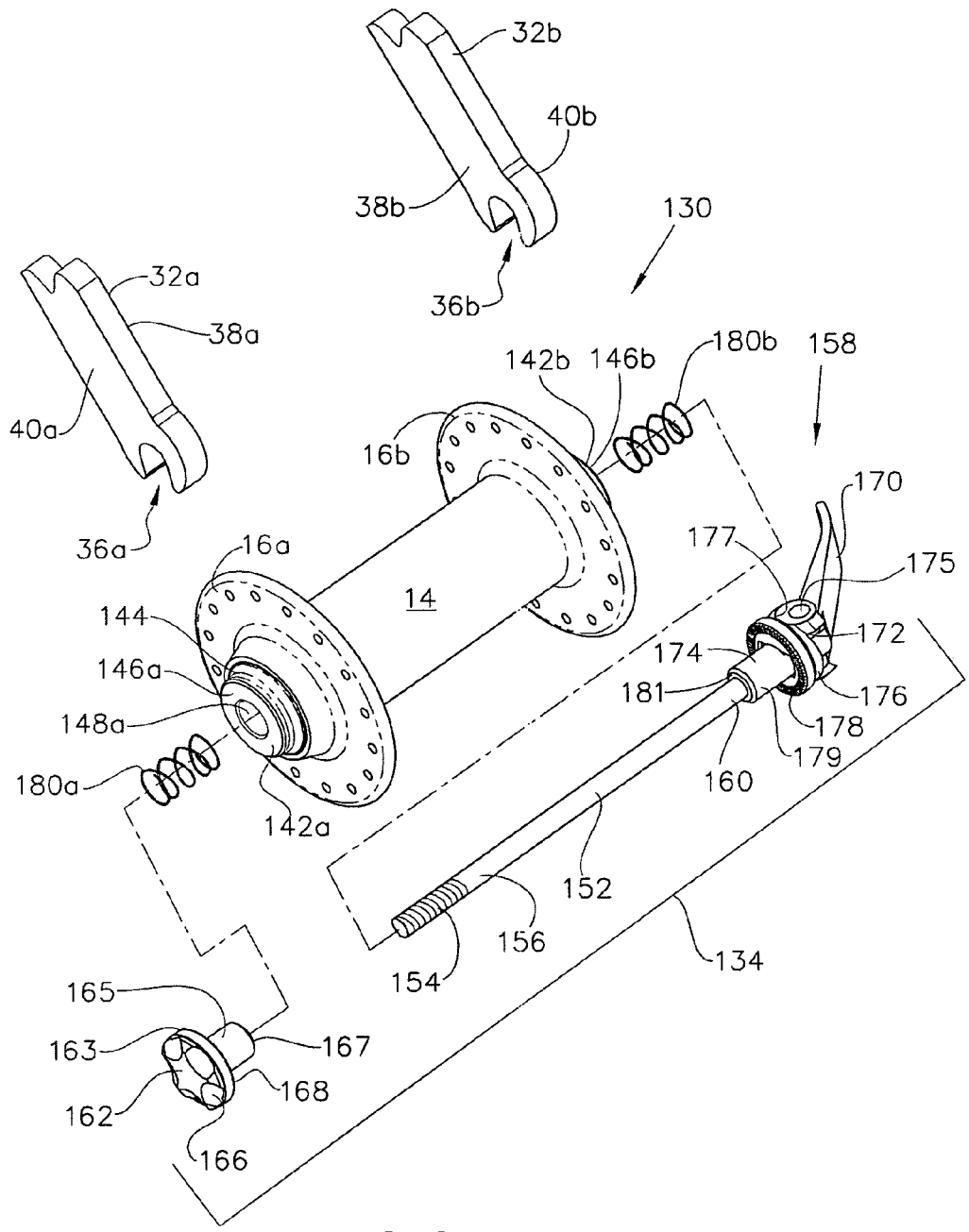
FIG. 3a is an is an exploded perspective view of a first embodiment of the present invention, showing the hub assembly and including the dropouts of a frame and the quick release skewer assembly.
Figure 3B:
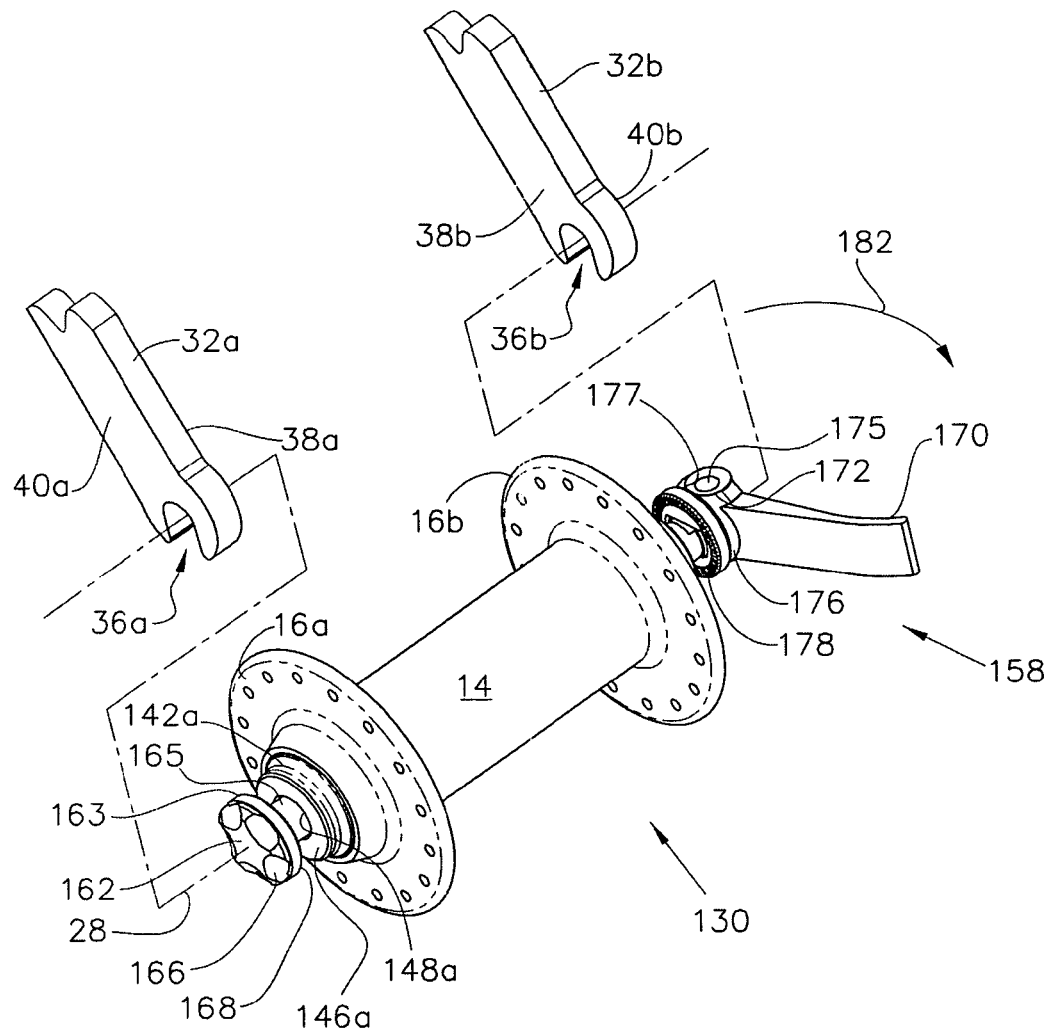
FIGS. 3b-d are exploded perspective views of the embodiment of FIG. 3a, showing the progressive sequential steps involved in mounting the hub assembly to the frame.
Figure 3C:
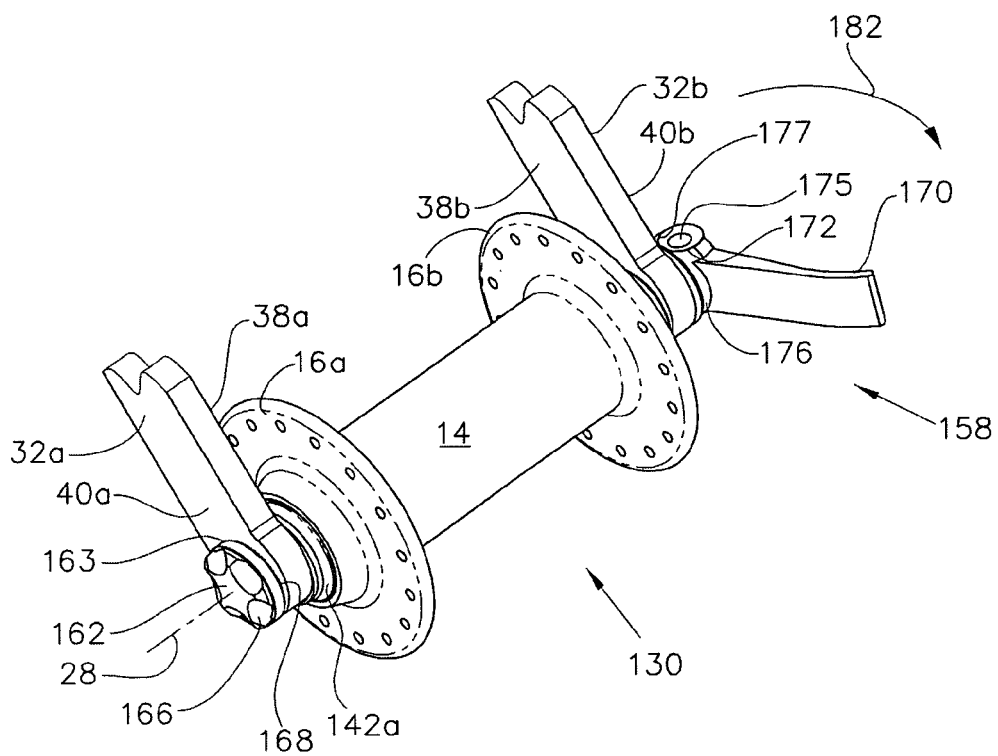
Figure 3D:
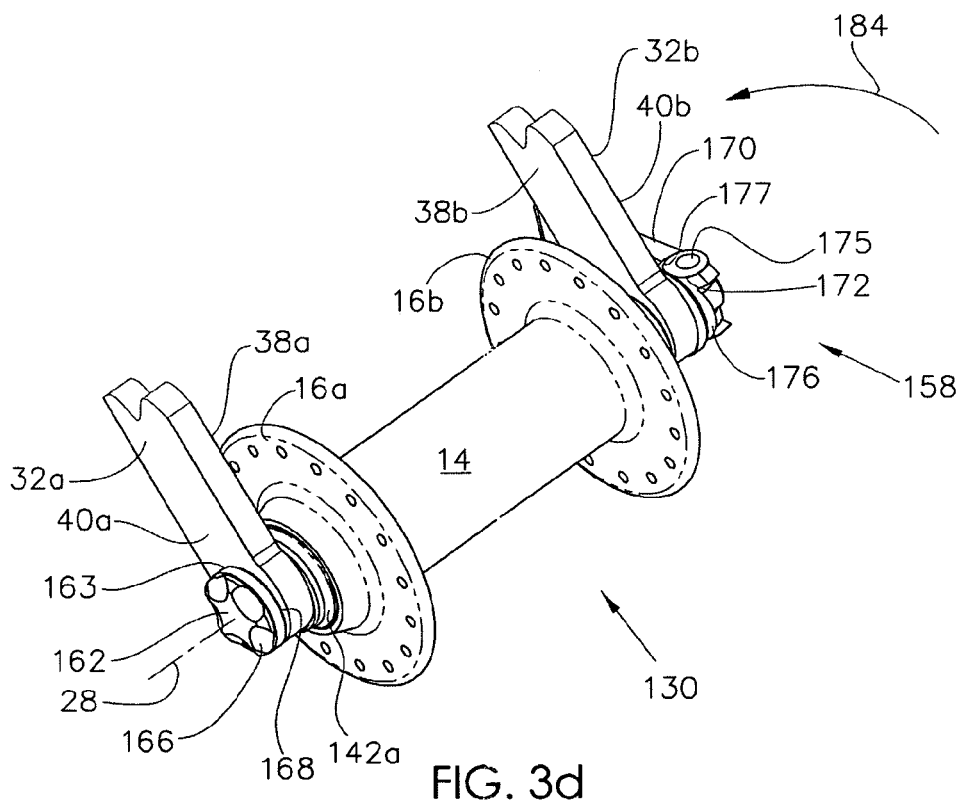
Figure 3E:
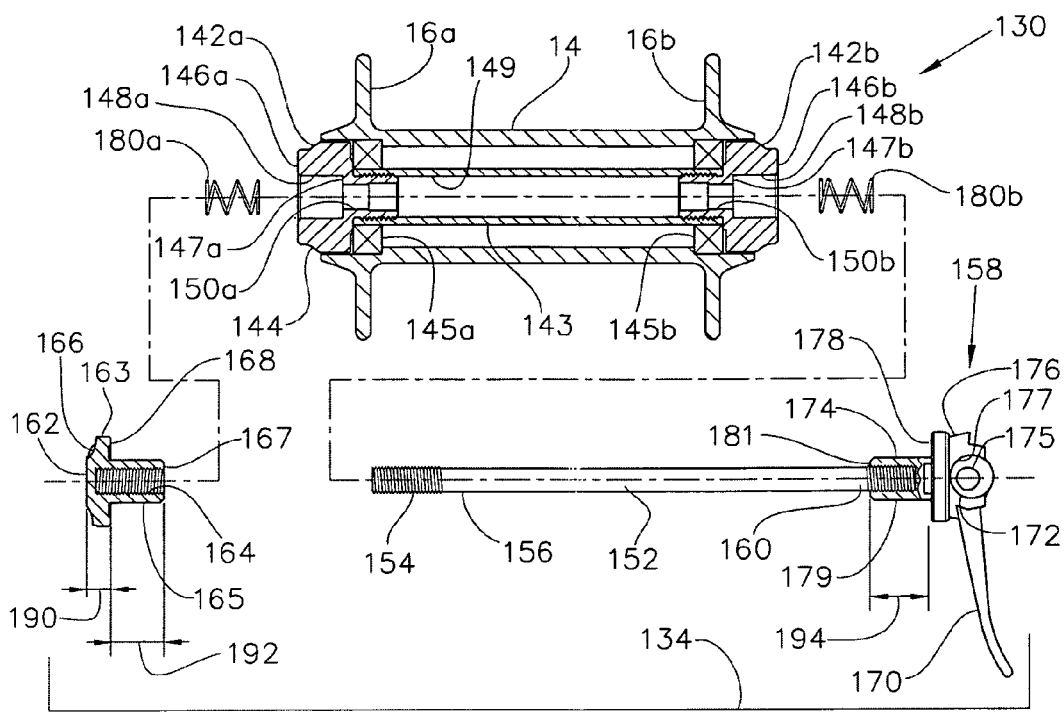
FIGS. 3e-h are axial cross-sectional views of the embodiment of FIG. 3a, showing the progressive sequential steps involved in mounting the hub assembly to the frame.

Referring to FIGS. 3a and 3e, the hub assembly 130 includes an axle assembly 144 and a hub shell 14 and hub flanges 16a and 16b. In this case, the axle assembly 144 is generally stationary and fixed to the frame of the bicycle, while the hub shell 14 is rotatable about the axle assembly 144 by means of bearing assemblies (visible in FIGS. 3e-h) about axial axis 28. The hub shell 14 includes and two hub flanges 16a and 16b that are adapted to connect with the inner ends of spokes (not shown). The axle assembly 144 includes axlecaps 142a and 142b, which each include outer faces 146a and 146b respectively. Outer faces 146a and 146b are generally axially opposed and face away from each other. Axlecaps 142a and 142b also include cylindrical recesses or counterbores 148a and 148b and holes 150a and 150b (visible in FIGS. 3e-h) respectively, with respective shoulders 147a and 147b therebetween. Axle 143 is hollow and includes axle bore 149. Counterbores 148a and 148b and holes 150a and 150b and axle bore 149 constitute a continuous axial passage or opening that extends through the axle assembly 144. Counterbores 148a and 148b are sized to accept the collar portion 165 of piloting nut 162 and the collar portion 179 of pilot shaft 174 respectively. Holes 150a and 150b are sized to accept the skewer shaft 152 of the quick release skewer assembly 134.

The quick release skewer assembly 134 includes skewer shaft 152, piloting nut 162, cam-actuated clamping assembly 158 and compression springs 180a and 180b. Skewer shaft 152 includes a male threaded portion 154 at its adjustable end 156 and is fixed to the pilot shaft 174 of the clamping assembly 158 at its clamping end 160. Piloting nut 162 consists of an enlarged head portion 163, an axially extending cylindrical collar portion 165, end face 167, and internally threaded hole 164. It is noted that threaded hole 164 is shown as a blind hole, which may be preferable to provide a clean external appearance in comparison with a through hole, which may alternatively be substituted. The enlarged head portion 163 includes an axially inward-facing gripping face 168 to bear against the outer face 40a of dropout 32a and a circumferential configured surface 166, consisting of a series of circumferentially alternating recessed surfaces and raised surfaces around its perimeter, to facilitate its manual manipulation. The outside diameter of collar portion 165 is sized to provide radial positioning alignment between the hub assembly 130 and the dropout 32a when it is nested within slot 36a. In this respect, the collar portion functions much the same as axle stub 48a of FIGS. 2a-h. Further, the outside diameter of collar portion 165 is sized to provide a locating clearance fit with the counterbore 148a, such that when the collar portion 165 is axially overlapped and piloted to provide radial locating alignment with the counterbore 148a, the collar portion 165 may now provide radial positioning alignment with both the dropout 32a and the axlecap 142a.

Clamping assembly 158 includes a lever 170 with a cam surface 172 that rotates about the pilot shaft 174 via pivot shaft 175 and a follower bushing 176 with a follower surface 177 and an axially inboard facing gripping face 178. Pilot shaft 174 is threadably locked and axially fixed to the clamping end 160 of the skewer shaft 152 as shown and includes cylindrical collar portion 179 whose outside diameter is sized to provide radial positioning locating alignment between the hub assembly 130 and the dropout 32b when it is nested within slot 36b. In this respect, the collar portion 179 functions much the same as axle stub 48b of FIGS. 2a-h. Pilot shaft 174 also includes end face 181. It is noted that a portion of the threaded engagement between the skewer shaft 152 and the pilot shaft 174 extends to be axially inboard of the corresponding gripping face 178. Further, the outside diameter of collar portion 179 is sized to provide a locating clearance fit with the counterbore 148b, such that when the collar portion 179 is axially overlapped and piloted to provide radial locating alignment with the counterbore 148b, the collar portion 179 may now provide radial positioning alignment with both the dropout 32a and the axlecap 142b. Compression springs 180a and 180b are sized such that their outside diameter has a radial clearance fit with counterbores 148a and 148b respectively and their inside diameters are sized to have a radial clearance fit with the skewer shaft 152. In this embodiment, it is noted that collar portion 165 of the piloting nut 162 is in fixed relation to its associated gripping face 168 and pilot shaft 174 is axially displaceable relative to its associated gripping face 178.

As the lever 170 is rotated about the pivot shaft 175, the cam surface 172 cams against the follower surface 177, causing the follower bushing 176 to be selectively displaced in the axial direction such that the grip face 178 is axially moveable relative to the pilot shaft 174 and its associated skewer shaft 152. Thus, it may be seen that the quick release skewer assembly 134 has two modes to adjust the axial separation of gripping faces 168 and 178: (i) the threadable engagement between threaded portion 154 and threaded hole 164 and (ii) the camming interface between the cam surface 172 and follower surface 177.

FIG. 3a shows the components of the hub assembly 130, quick release skewer assembly 134, and dropouts 32a and 32b in exploded view for clarity. Next, FIG. 3b shows the quick release skewer assembly 134 as pre-assembled to the hub assembly 130. Please refer to FIGS. 3e-h for items described but not otherwise shown in FIGS. 3a-d. The skewer shaft 152 is first passed through the spring 180b and through counterbores 148a and 148b, axle bore 149, and holes 150a and 150b such that its threaded portion 154 extends within counterbore 148a. The spring 180a is assembled over the adjustable end 156 of skewer shaft 152 and nested within counterbore 148a. Piloting nut 162 is then loosely threaded onto the threaded portion 154 of skewer shaft 152, with threaded hole 164 threadably engaged with threaded portion 154. It is noted that a portion of the threaded engagement between the threaded portion 154 and the threaded hole 164 extends to be axially inboard of the corresponding gripping face 168. Collar portion 165 is now piloted and axially overlapping within counterbore 148a and collar portion 179 is now piloted and axially overlapping within counterbore 148b. The hub assembly 130 is then axially aligned with dropouts 32a and 32b such that inboard face 38a is aligned with outer face 146a and inboard face 38b is aligned with outer face 146b. The lever 170 is moved in direction 182 into the "open" or unclamped position, such that the cam interface between cam surface 172 and follower bushing 176 is in the retracted position to provide maximum axial separation between gripping faces 168 and 178.

Figure 3F:
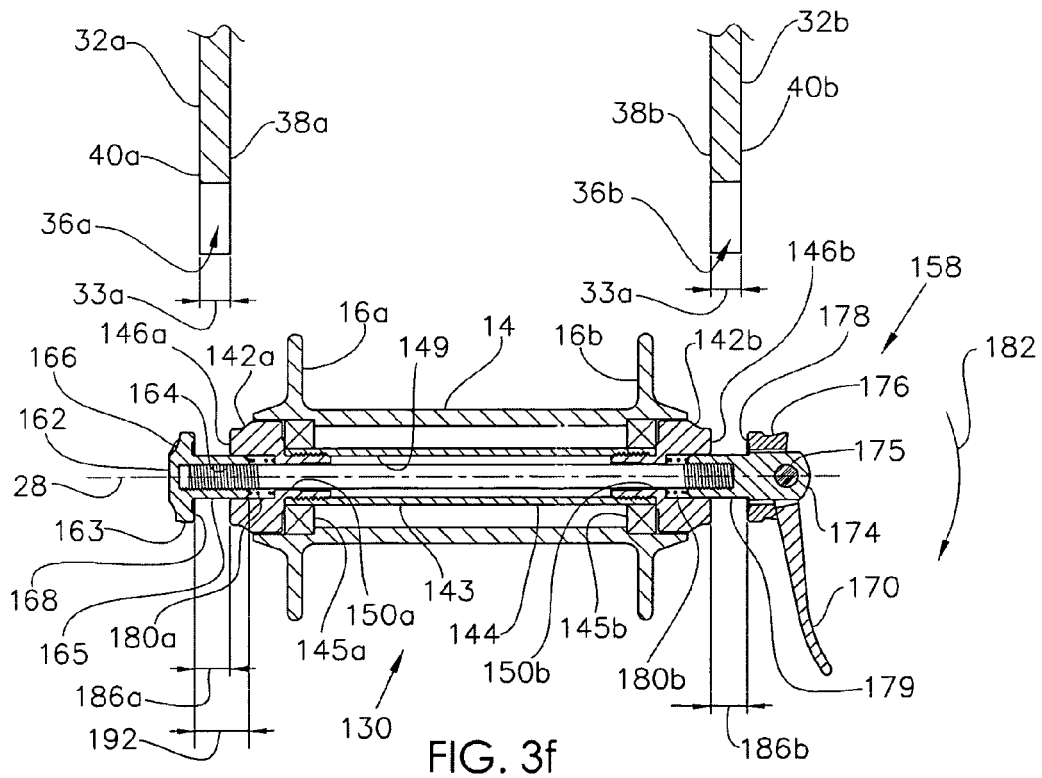

Shoulders 147a and 147b and end faces 167 and 181 serve as end-stops to bear against corresponding compression springs 180a and 180b. Spring 180a is axially sandwiched between the end face 167 of the collar portion 165 and the shoulder 147a of the axle assembly 144 and spring 180b is axially sandwiched between the end face 181 of the pilot shaft 174 and the shoulder 147b of the axle assembly 144 (as clearly described in FIGS. 3f-h). Springs 180a and 180b are shown to bear against respective end faces 167 and 181 and shoulders 147a and 147b and serve to bias the piloting nut 162 and the clamping assembly 158 toward their axially separated and spread position relative to outer faces 146a and 146b respectively and to maintain expanded or open gaps 186a and 186b (as shown in FIG. 3f) therebetween. As an alternative to using two springs 180a and 180b, only a single spring (180a or 180b) may be utilized to maintain expanded or open gaps (186a and/or 186b) and/or to bias the piloting nut 162 and the follower bushing 176 toward their axially separated and spread position relative to outer faces 146a and 146b.

Next, FIG. 3c shows the hub assembly 130 as pre-assembled and positioned within the dropouts 32a and 32b. Collar portion 165 and pilot shaft 174 are assembled to dropouts 32a and 32b in a generally radial direction and introduced through open slots 36a and 36b respectively in the conventional manner. Collar portion 165 and pilot shaft 174 are now nested within corresponding slots 36a and 36b and piloted within counterbores 148a and 148b respectively to provide radial positional alignment between the hub assembly 130 and the dropouts 32a and 32b. Also, inboard faces 38a and 38b are now loosely contacting faces 146a and 146b respectively. The lever 170 is still shown in the "open" position. The piloting nut 162 is then threadably adjusted relative to the skewer shaft 152 by means of the threadable engagement between threaded portion 154 and threaded hole 164 such that the axial separation between gripping faces 168 and 178 is set to the desired distance.

Next, as shown in FIG. 3d, the lever 170 is selectively moved in direction 184 into the "closed" or clamped position, such that the cam interface between cam surface 172 and follower surface 177 places the follower bushing 176 in an extended position such that gripping faces 168 and 178 are axially contracted and moved toward each other via the skewer shaft 152. Gripping face 168 is now pressed and clamped against outboard face 40a. This causes the frame (not shown) to flex slightly, allowing dropout 32a to be displaced such that inboard face 38a is also pressed and clamped against outer face 146a. Simultaneously, gripping face 178 is now pressed and clamped against outboard face 40b, and inboard face 38b is also pressed and clamped against outer face 146b. Thus, dropout 32a is now sandwiched and clamped between gripping face 168 and outer face 146a and dropout 32b is now sandwiched and clamped between gripping face 178 and outer face 146b. The hub assembly 130 is now firmly assembled to both dropouts 32a and 32b.

It should be noted that the skewer shaft 152 may serve as an elastic tensile spring to maintain a desired clamping force between gripping faces 168 and 178 to securely clamp the dropouts 32a and 3b. In other words, the skewer shaft 152 may stretch slightly during clamping to add a small amount of resiliency to the system and/or to control the clamping force. If such a resilience is desired, it may be preferable that the skewer shaft 152 be of steel or titanium material and sized with a cross sectional area equivalent to approximately a 20 square millimeters (i.e. a cross sectional area approximately between 10 and 35 square millimeters) to provide the optimal tensile stiffness properties of the skewer shaft 152. It should also be noted that the outside diameters of collar portions 165 and 179 are shown to be larger than the skewer shaft 152 such that their external surface is radially outboard the external surface of the skewer shaft 152. This provides the requisite locating and piloting geometry of the collar portions 165 and 179 while still maintaining the stiffness properties of the skewer shaft 152. It is envisioned that that the skewer shaft 152 may alternatively be sized with an external surface that is radially coincident with, or even radially larger than, one or both of the collar portions 165 and 179.

Removal of the hub assembly 130 from the dropouts 3a and 32b is essentially the reverse of the installation procedure just described. The lever 170 is selectively moved back in direction 182 into the "open" or unclamped position, such that the cam interface between cam surface 172 and follower surface 177 moves the follower bushing 176 to a retracted position, such that gripping faces 168 and 178 are axially expanded and permitted to move axially apart from each other via the skewer shaft 152. Thus the hub assembly 130 is now released and unclamped from the dropouts 32a and 32b and may now be withdrawn from the frame (not shown).

FIG. 3e corresponds to FIG. 3a and shows the majority of the hub assembly 130 and skewer assembly 134 in cross section for further clarity. The clamping assembly 158 is shown in partial cross section. It is shown that the axle assembly 144 is made up of axlecaps 142a and 142b and axle 143 with axle bore 149. Hub shell 14 is rotatable about the axle assembly 144 via bearing assemblies 145a and 145b. It is shown that collar portion 165 has an axial width 192 and head portion has an axial width 190. Similarly, collar portion 179 of the pilot shaft 174 has an axial width 194 between end face 181 and gripping face 178. It is noted that width 194 corresponds to a retracted position of the clamping assembly 158, where cam surface 172 is selectively positioned (via lever 170) against follower surface 177 to permit a maximum axial width 194.

FIG. 3f corresponds to FIG. 3b and shows the hub assembly 130, skewer assembly 134, and dropouts in cross section for further clarity. Dropouts 32a and 32b have axial thickness 33a and 33b respectively. Similarly, gap 186a exists between gripping face 168 and outer face 146a and gap 186b exists between gripping face 178 and outer face 146b. In this figure, with the lever 170 in the "open" position, gaps 186a and 186b are shown in their open and expanded position. Axial width 192 is wider than axial thickness 33a of dropout 32a and also wider than gap 186a such that a portion of this axial width 192 extends to be axially inboard of outer face 146a and that collar portion 165 is axially overlapping and piloted within counterbore 148a. Similarly, axial width 194 is wider than axial thickness 33b of dropout 32b and also wider than gap 186b such that a portion of this axial width 194 extends to be axially inboard of outer face 146b and that collar portion 179 is axially overlapping and piloted within counterbore 148b.

Figure 3G:
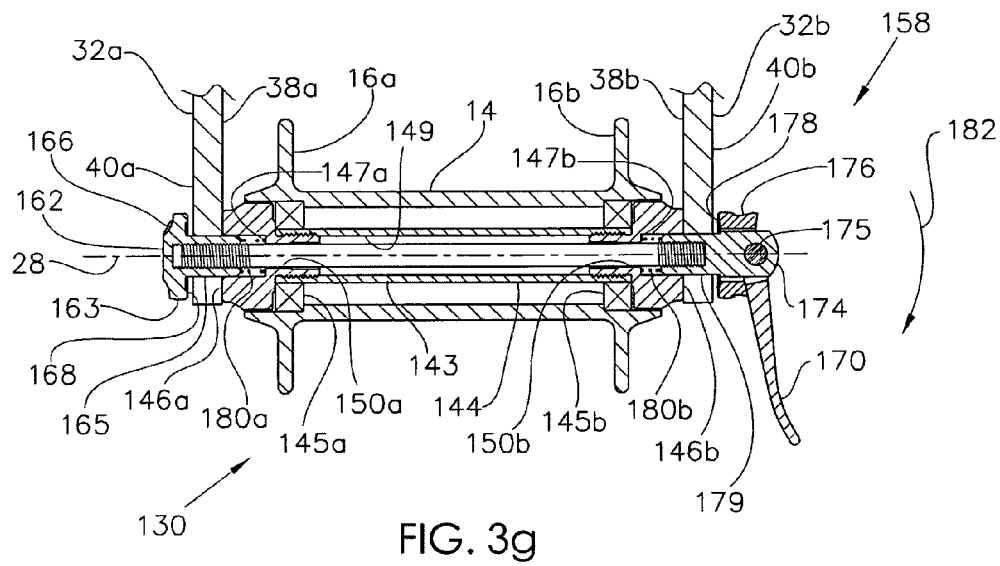

FIG. 3g corresponds to FIG. 3c and shows the hub assembly 130, skewer assembly 134, and dropouts in cross section for further clarity. Collar portions 165 and 179 are now nested within slots 36a and 36b respectively to provide radial positioning alignment between the piloting nut 162 and dropout 32a and between the pilot shaft 174 and dropout 32b. Collar portions 165 and 179 are also piloted within counterbores 148a and 148b respectively to provide radial positioning alignment between the hub assembly 130 and the dropouts 32a and 32b. Lever 170 is still in the "open" position and inboard faces 38a and 38b are now loosely contacting faces 146a and 146b respectively. Also, axial clearance exists between gripping face 168 and outboard face 40a and between gripping face 78 and outboard face 40b.

Figure 3H:
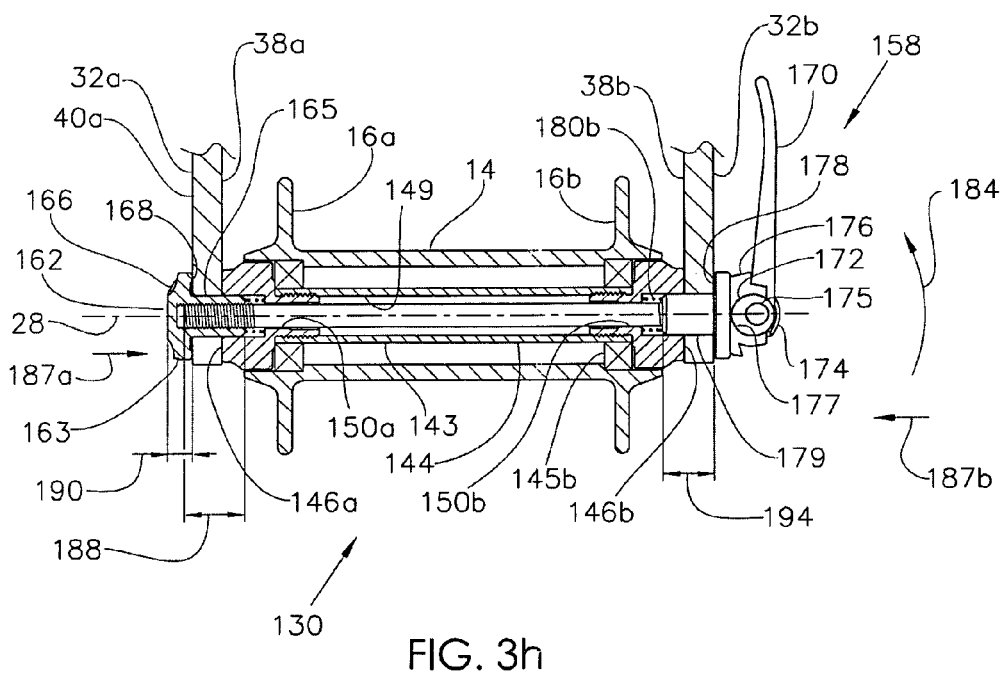

FIG. 3h corresponds to FIG. 3d and shows the hub assembly 130, skewer assembly 134, and dropouts in cross section for further clarity. The clamping assembly 158 is shown without cross section. Lever 170 is now shown as moved in direction 184 into the "closed" position such that cam surface 172 cams against follower surface 177 to displace follower bushing 176 in direction 187b and piloting nut 162 in direction 187a (by means of skewer shaft 152). It is noted that width 194 corresponds to an extended position of the clamping assembly 158, where cam surface 172 is selectively positioned (via lever 170) against follower surface 177 to reduce the axial width 194 such that griping faces 168 and 178 are brought toward each other. Gaps 186a and 186b are thus reduced and eliminated such that gripping face 168 is now pressed and clamped against outboard face 40a, and inboard face 38a is also pressed and clamped against outer face 146a. Simultaneously, gripping face 178 is now pressed and clamped against outboard face 40b, and inboard face 38b is also pressed and clamped against outer face 146b. Thus, dropout 32a is now sandwiched and clamped between gripping face 168 and outboard face 140a and dropout 32b is now sandwiched and clamped between gripping face 178 and outboard face 140b. It is also noted that the threaded engagement between the threaded hole 164 and the threaded portion 154 extends axially inboard of the outboard face 40a of the dropout 32a.

It should be noted that, in the prior art embodiment of FIGS. 2a-h, the radial positioning alignment of the hub assembly 30 with respect to the dropouts 32a and 32b is provided solely by means of the axle stubs 48a and 48b of the axle assembly 44. In contrast, the embodiment of FIGS. 3a-h show that this radial positioning alignment of the hub assembly 130 with respect to the dropouts 32a and 32b is provided by means located within the quick release assembly 134, more specifically by means of the collar portions 165 and 179. It is further noted that the axle assembly 144 does not include the axle stubs 48a and 48b of FIGS. 2a-h to provide such radial positioning.

It may be termed that a longitudinal engagement is an engagement that includes a continuous longitudinal engagement interface or an engagement that includes at least two engagement interface locations that are longitudinally spaced along the longitudinal axis of the spoke. The threaded engagement between the threaded portion 154 and the threaded hole 164 may be considered a longitudinal engagement, since the helical thread extends along the axial axis 28. It should be noted that the threaded engagement between the threaded portion 154 of the skewer shaft 152 and the threaded hole 164 of the adjusting nut 162 extends axially inboard of the outboard surface 40a of the dropout 32a. A certain minimum thread engagement length 188 is necessary to prevent stripping and/or damage to this threaded engagement under load. Since this thread engagement length 188 extends axially inboard of the outboard surface 40a, the outboard width 190 of the piloting nut 162 may be significantly reduced in comparison with width 90 of prior art designs. This minimized outboard width 190 results in a shallower axial protrusion relative to prior art designs for reduced aerodynamic drag, improved aesthetics and lighter weight.

It should also be noted that the radial locating and alignment of the hub assembly 130 and quick release skewer assembly 134 is provided by the nested radial engagement between the collar portions 165 and 179 and the slots 36a and 36b respectively. Collar portion 165 of the piloting nut 162 and collar portion 179 of the clamping assembly are part of the quick release skewer assembly 134 and extend axially inwardly from their respective gripping faces 168 and 178. Further, as shown in FIGS. 3*f-h*, collar portions 165 and 179 are also axially overlapping and piloted within counterbores 148*a* and 148*b* respectively. Since the outside diameter of collar portions 165 and 179 have a close clearance fit with their mating counterbores 148*a* and 148*b* in the region of overlap, this engagement controls the radial location and alignment between the collar portions 165 and 179 and counterbores 148*a* and 148*b*. Thus it may be seen that collar portion 165 provides radial alignment between the axle assembly 144 (and hub assembly 130) and dropout 32*a*. Similarly, collar portion 179 provides radial alignment between the axle assembly 144 (and hub assembly 130) and dropout 32*b*. In other words, collar portions 165 and 179 are functional to provide radial locating engagement with both the axle assembly 144 and the dropouts 32*a* and 32*b* respectively. This is in contrast to the prior art configuration of FIGS. 2*a-g* which relies the axle stubs 48*a* and 48*b* (of the axle assembly 44) to provide radial alignment between the axle assembly 44 and the dropouts 32*a* and 32*b*. It is also noted that the threaded engagement between the threaded hole 164 and the threaded portion 154 extends axially inboard of the outboard face 40*a* of the dropout 32*a* and further extends axially inboard of the outer face 146*a* of the axle cap 142*a*.

It is noted that the embodiment of FIGS. 3*a-h* shows a threaded engagement between the skewer shaft 152 and both the piloting nut 162 and pilot shaft 174. The threaded engagement is threadably adjustable with the piloting nut 162 to provide facility for axial adjustment between the two and threadably fixed with the pilot shaft 174 to serve as a nonadjustable connection. Alternatively, both threaded engagements may be threadably adjustable or both threaded engagements may be threadably fixed. As a further alternative, a wide range of alternative fastening means may be substituted for one or both of these threaded connection(s), such as fastened or retained connections or deformed connections, such as crimped or swaged connections.

It is noted that the piloting 162 nut may be manually adjusted by gripping the configured surface 166 with the operator's fingers. Alternatively, the configured surface 166 may be engaged with a wrench or tool to facilitate adjustment. As a further alternative, the external surface of the piloting nut 162 may be smooth and non-configured.

Figure 4:
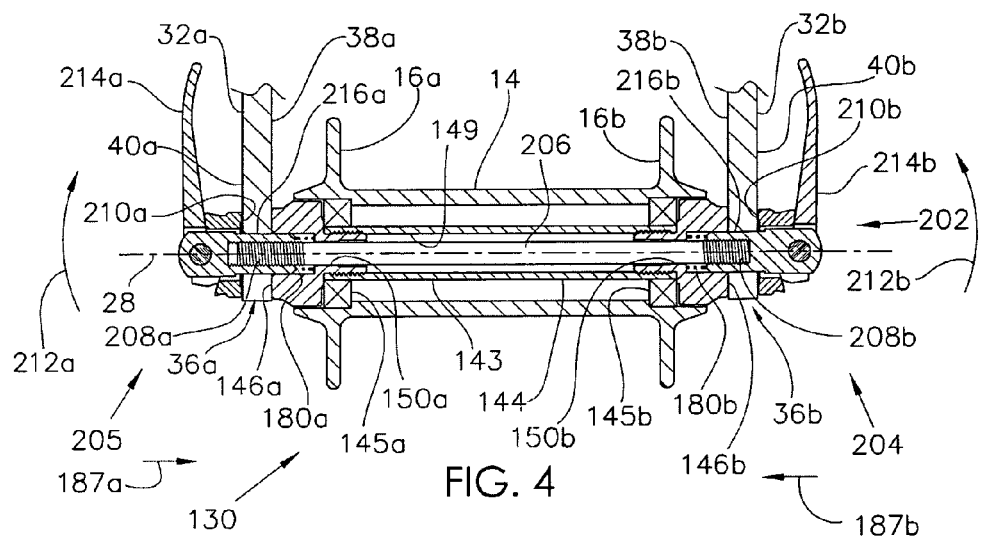
FIG. 4 is an axial cross-sectional view of a second embodiment of the present invention, showing a quick release skewer assembly with two clamping assemblies.

It is noted that collar portions 165 and 179 are shown as circular cylindrical collars. This allows collar portions 165 and 179 to be easily rotated or aligned about the axial axis 28 relative to slots 36*a* and 36*b* respectively and circular counterbores 148*a* and 148*b* respectively. Alternatively, collar portions 165 and 179 may have a noncircular external portion which may be used to provide a rotatably keyed engagement about the axial axis 28 relative to slots 36*a* and 36*b* respectively and/or counterbores 148*a* and 148*b* respectively. The embodiment of FIGS. 3*a-h* shows a quick release skewer assembly 134 where the head portion 163 and gripping face 168 of the piloting nut 162 is fixed relative to the collar portion 165 and is threadably adjustable relative to the skewer shaft 152. In contrast, the gripping face 178 of the clamping assembly 158 is selectively displaceable relative to the collar portion 179 of the pilot shaft 174 to include axially extended and retracted orientations. Alternatively, as shown in FIG. 4, a second clamping assembly may be utilized in place of the piloting nut 162. FIG. 4 shows a hub assembly 130 and dropouts 32*a* and 32*b* that are identical to the hub assembly 130 and dropouts 32*a* and 32*b* described in FIGS. 3*a-h*. The quick release skewer assembly 202 of FIG. 4 is shown to include a skewer shaft 206, a fixed clamping assembly 204 that is axially locked to the skewer shaft 206 and an adjustable clamping assembly 205 that is threadably adjustable with the skewer shaft 206. Skewer shaft 206 includes two threaded portions 208*a* and 208*b*. Fixed clamping assembly 204 is selectively axially extended by pivoting lever 214*b* in direction 212*b* to allow its corresponding gripping face 210*b* to be axially displaced relative to the collar portion 216*b* and skewer shaft 206 as previously described.

Collar portion 216*a* of adjustable clamping assembly 205 may be threadably adjusted relative to threaded portion 208*a* of skewer shaft 206 to provide the optimal axial separation between gripping faces 210*a* and 210*b* for proper clamping of the dropouts 32*a* and 32*b*. Adjustable clamping assembly 205 is selectively axially extended by pivoting lever 214*a* in direction 212*a* to allow its corresponding gripping face 210*a* to be axially displaced relative to the collar portion 216*a* and skewer shaft 206 as previously described. Clamping assemblies 204 and 205 are generally identical to clamping assembly 158 as previously described in FIGS. 3*a-h*, however clamping assembly 205 may be threadably adjusted to selectively control the axial spacing between gripping face 210*a* and gripping face 210*b*. FIG. 4 shows clamping assemblies 204 and 205 in the extended orientation with gripping face 210*a* pressing dropout 32*a* in direction 212*a* and with gripping face 210*b* pressing dropout 32*b* in direction 212*b* to clamp and secure the hub assembly 130 to dropouts 32*a* and 32*b*. The embodiment of FIG. 4 describes a generic example of a quick release skewer assembly that employs two axially extendable clamping assemblies.

Figure 5:
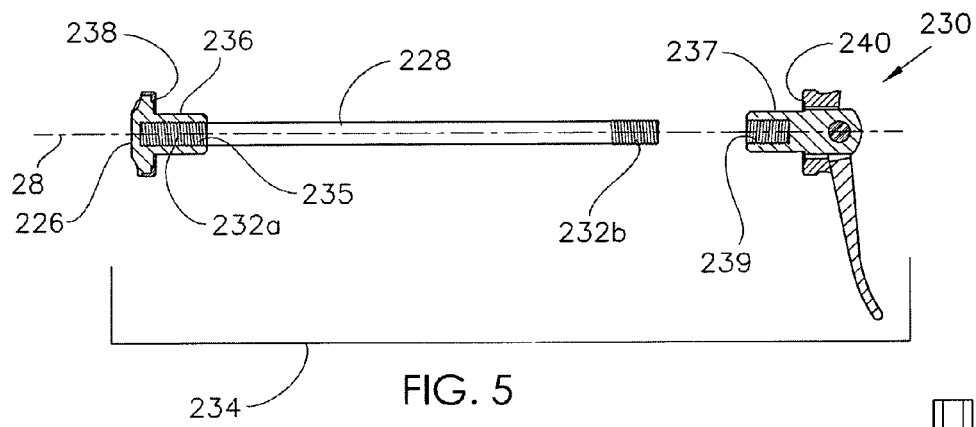
FIG. 5 is an axial cross-sectional view of a third embodiment of the present invention, showing a quick release skewer assembly with a threadably adjustable engagement between the skewer shaft and the clamping assembly.

The embodiment of FIG. 5 shows another alternate embodiment, with a quick release skewer assembly 234 similar to the quick release skewer assembly 134 of FIGS. 3*a-h*, including skewer shaft 228 with threaded portions 232*a* and 232*b*, piloting nut 226 with collar portion 236 and gripping face 238, and clamping assembly 230 with piloting shaft 237 and gripping face 240. Skewer shaft 228, piloting nut 226, and clamping assembly 230 are identical to the corresponding components as described in FIGS. 3*a-h*. However, in contrast to the embodiment of FIGS. 3*a-h* where piloting nut 162 is threadably adjustable relative to skewer shaft 152 and the pilot shaft 174 is threadably locked to the skewer shaft 152, FIG. 5 shows the internally threaded hole 235 of the piloting nut 226 as threadably locked to the threaded portion 232*a* of the skewer shaft 228 and the internally threaded hole 239 of the pilot shaft 237 as threadably adjustable relative to the threaded portion 232*b* of the skewer shaft 228. Thus, the axial distance between gripping faces 238 and 240 may be threadably adjusted at the threadable interface between the threaded hole 239 and the threaded portion 232*b*. Quick release skewer assembly 234 may otherwise be substituted for quick release skewer assembly 152 in the embodiment of FIGS. 3*a-h*.

Figure 6:
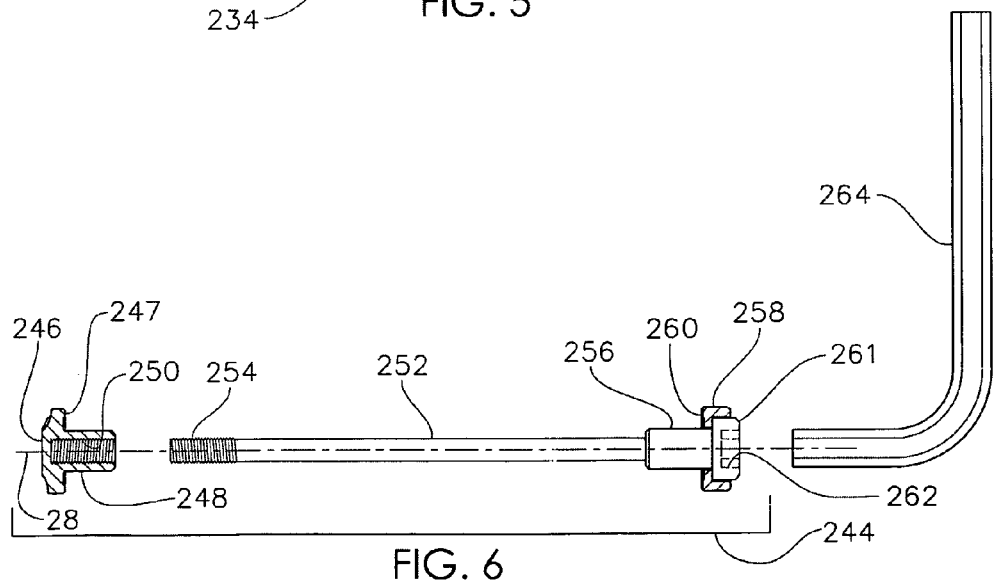
FIG. 6 is an axial cross-sectional view of a fourth embodiment of the present invention, showing a quick release skewer assembly without a cam actuated clamping assembly and with a threadable engagement to provide clamping pressure to clamp the dropouts.

The embodiment of FIG. 6 shows a further alternate embodiment, similar to the quick release skewer assembly 134 of FIGS. 3*a-h*, that eliminates the clamping assembly 158 and instead employs a threaded engagement to clamp and secure the hub assembly to the dropouts. Quick release skewer assembly 244 includes a piloting nut 246 is identical to piloting nut 162, with gripping face 247, collar portion 248 and internally threaded hole 250. Skewer shaft 252 includes a threaded portion 254, collar portion 256, headed end 261, hex socket 262, and washer 258 with gripping face 260. Hex socket 262 is sized to accept hex key 264, which may be utilized to rotate the skewer shaft 252 about the axial axis 28. Collar portion 248 has identical function to collar portion 165 and collar portion 256 has identical function to collar portion 179.

During assembly, with quick release skewer assembly 244 substituted for quick release skewer assembly 152 in the embodiment of FIGS. 3*a-h*, threaded hole 250 is threadably mated to threaded portion 254 of the skewer shaft 252. Next, hex key 264 may be temporarily engaged with hex socket 262 to threadably tighten the engagement between threaded portion 254 and threaded hole 250, which serves to axially contract gripping surfaces 247 and 260 axially inwardly toward each other to sandwich and clamp the dropouts 32*a* and 32*b* to secure the hub assembly to the dropouts in a manner previously described in FIGS. 3*a-h*. While the embodiment of FIGS. 3*a-h* shows a cam-activated clamping assembly 158 where the gripping face 178 is axially displaceable relative to the collar portion 179, the embodiment of FIG. 6 is representative of an alternate means to clamp and secure the hub assembly to the dropouts, where the gripping face 260 is axially locked to the collar portion 256. FIG. 6 also shows a threaded engagement to selectively control the axial distance between opposing gripping faces (246 and 260) to clamp the dropouts, in contrast to the cam-activated clamping means described in FIGS. 3*a-h*.

Figure 7A:
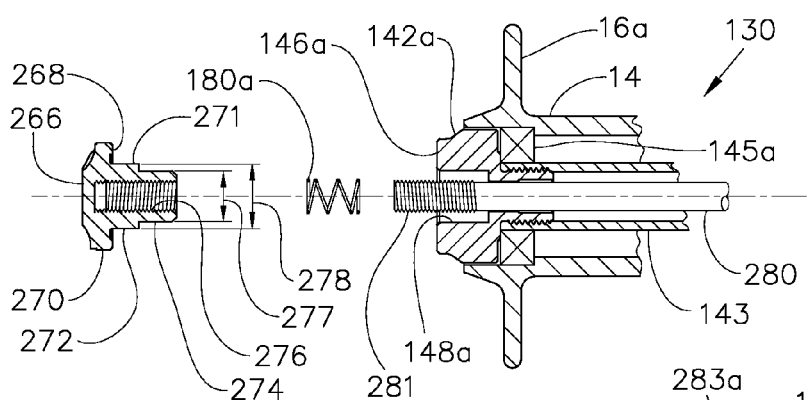
FIG. 7a is a partial axial cross-sectional exploded view of a fifth embodiment of the present invention, showing piloting nut with a stepped collar portion that has larger diameter geometry to provide locating alignment with the dropout and smaller diameter geometry for piloting with the axle assembly.
Figure 7B:
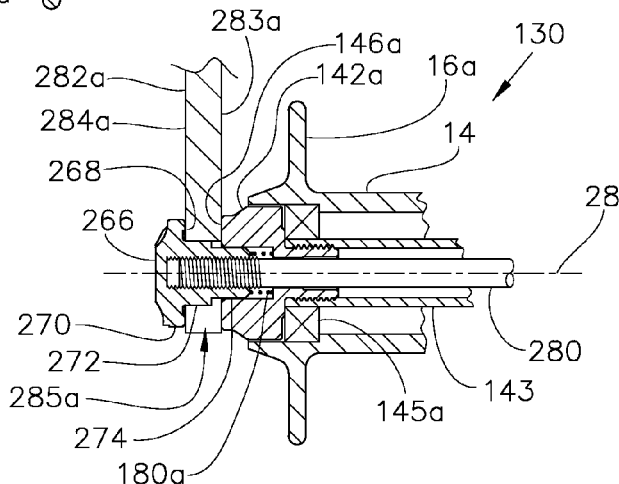
FIG. 7b is a partial axial cross-sectional view of the embodiment of FIG. 7a, showing the piloting nut as assembled with the dropouts and hub assembly.

FIGS. 7*a-b* describe another alternate embodiment, similar to the embodiment of FIGS. 3*a-h*, that instead employs a piloting nut 266 with a stepped collar portion 271. Piloting nut 266 includes an enlarged head portion 270, a collar portion 271, and an internally threaded hole 276. Collar portion 271 comprises a large stepped portion 272 with a diameter 278 to and a small stepped portion 274 with a diameter 277. Hub assembly 130 is shown in fragmentary section view and is identical to the hub assembly of FIGS. 3*a-h* and rotatable about axial axis 28. Dropout 282*a* is similar to dropout 32*a* and includes inboard face 283*a*, outboard face 284*a* and slot 285*a*, which is sized to receive large stepped portion 272 of diameter 278. Internally threaded hole 276 is threadably engaged to threaded portion 281 of the skewer shaft 280 similar to that described in FIGS. 3*a-h*.

In contrast to the straight collar portion 165 of FIGS. 3*a-h* that has a generally constant diameter, the stepped collar portion 266 of piloting nut 266 is stepped to have two diameters. Diameter 278 of large stepped portion 272, which is adjacent the gripping face 268, is sized to be nested within slot 285*a* to provide radial positioning alignment between the hub assembly 30 and the dropout 285*a*. Diameter 277 of small stepped portion 274, which is axially spaced from the gripping face 268, is smaller than diameter 278 and is sized to provide a locating clearance fit with the counterbore 148*a*, such that when the small stepped portion 274 is axially overlapped and piloted with the counterbore 148*a*, the small stepped portion 274 may now provide radial positioning alignment with the axlecap 142*a*.

FIG. 7*a* shows the skewer shaft 280 assembled with the hub assembly 130 and piloting nut 266 prior to its threaded assembly with the skewer shaft 280. FIG. 7*b* shows the piloting nut 266 as threadably assembled with the skewer shaft 280 and dropout 282 clamped and sandwiched between gripping face 268 and outer face 146*a* in a manner similar to that described in FIGS. 3*a-h*. It may be seen that large stepped portion 272 is nested in slot 285*a* of dropout 282*a* to provide radial locating between the piloting nut 266 and the dropout 282*a*. Additionally, small stepped portion 274 is piloted and axially overlapped with counterbore 148*a* to provide radial locating between the hub assembly 130 and the piloting nut 266. It is also noted that the threaded engagement between the threaded hole 276 and the threaded portion 281 extends axially inboard of the outboard face 284*a* of the dropout 282*a* and further extends axially inboard of the outer face 146*a* of the axle cap 142*a*.

The piloting nut 266 is but one representative example of how the collar portion may employ a multiplicity of geometries or a variable geometry that may be optimized to interface with the dropout and/or hub assembly. In a further alternative configuration the small stepped portion may be located adjacent the gripping face 268 and the large stepped portion may be axially spaced from the gripping face 268. In a yet further alternative, the collar portion of the piloting nut may employ variable geometry, such as an axially tapered or conical surface. In a still further alternative, the collar portion may employ noncircular or keying geometry such that it may be rotationally keyed (about the axial axis 28) to engage mating noncircular or keying geometry of the axle cap. This keyed engagement could be utilized to prevent relative rotation (about the axial axis 28) between the collar portion and the counterbore of the axle cap.

Figure 8A:
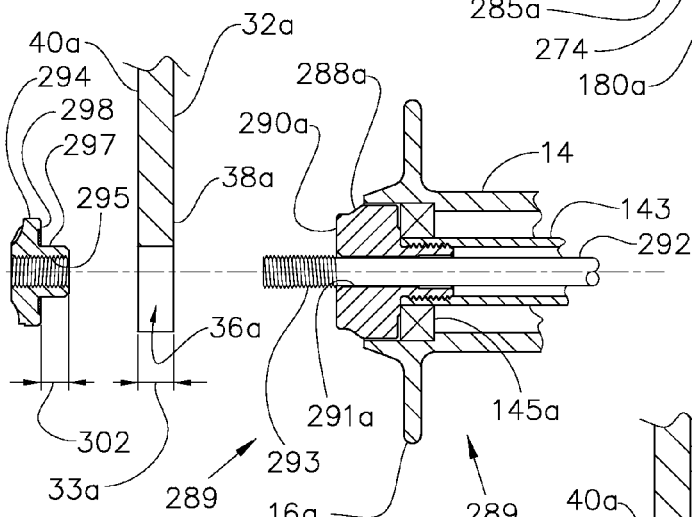
FIG. 8a is a partial axial cross-sectional exploded view of a sixth embodiment of the present invention, showing a collar portion with geometry to provide locating alignment with the dropout and with the skewer shaft providing piloting with the axle assembly, where the collar portion does not engage the axle cap.
Figure 8B:
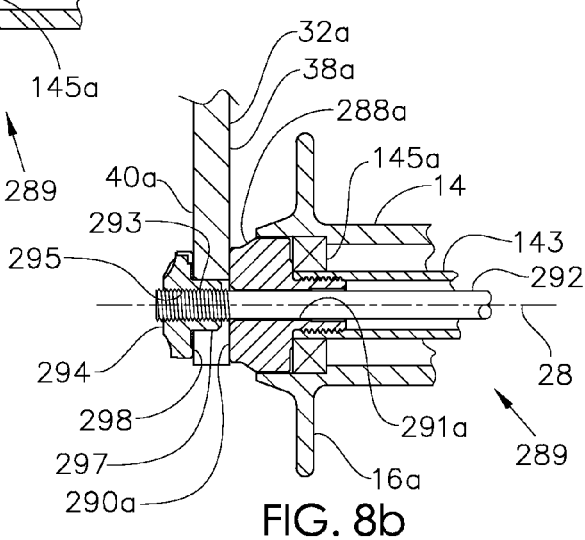
FIG. 8b is a partial axial cross-sectional view of the embodiment of FIG. 8a, showing the piloting nut as assembled with the dropouts and hub assembly.

FIGS. 8*a-b* describe yet another alternate embodiment, similar to the embodiment of FIGS. 3*a-h*. In place of the piloting nut 162 of FIGS. 3*a-h*, FIGS. 8*a-b* instead employs an alignment nut 294 with a collar portion 297 that radially engages the slot 36*a* of dropout 32*a*, but does not provide axial overlap or piloting with the hub assembly 289. Dropout 32*a* is identical to that shown in FIGS. 3*a-h* and includes open slot 36*a*, inboard face 38*a*, outboard face 40*a*, and axial width 33*a* between inboard face 38*a* and outboard face 40*a*. Hub assembly 289 is shown in fragmentary section view and is identical to the hub assembly 30 of FIGS. 3*a-h* with the exception of axle cap 288*a*, which includes outer face 290*a* and central bore 291*a*. The outside diameter of skewer shaft 292 is sized to provide a close clearance fit with central bore 291*a* as shown and includes threaded portion 293. Alignment nut 294 is similar to piloting nut 162 and includes head portion 296, collar portion 297, gripping face 298, and internally threaded hole 295. The axial width 302 of collar portion 297 is of somewhat smaller dimension than axial width 33*a* of dropout 32*a*.

FIG. 8*a* shows the skewer shaft 292 assembled with the hub assembly 289 and the alignment nut 294 prior to threaded assembly with the skewer shaft 289. Threaded end 293 is shown to protrude axially outboard from the outer face 290*a*. FIG. 8*b* shows the threaded hole 295 of the alignment nut 294 as threadably assembled with the threaded end 293 of the skewer shaft 289, with dropout 32*a* clamped and sandwiched between gripping face 298 and outer face 290*a* in a manner previously described in FIGS. 3*a-h*. It may be seen that collar portion 297 is nested in slot 36*a* of dropout 32*a* while skewer shaft 289 is piloted and axially overlapping central bore 291*a*.

In the embodiment of FIGS. 3*a-h* the collar portion 165 of the piloting nut 162 has an axial width 192 greater than the axial width 33*a* of its corresponding dropout, with the collar portion 165 having axial overlap with the counterbore 148*a* of the axlecap 142*a*. In contrast, the axial width 302 is less than the axial width 33*a* of its corresponding dropout. Thus, the collar portion only provides radial alignment by means of its nested engagement with the slot 36*a* and does not have any axial overlap or piloting with the axlecap 288*a*. Instead, radial alignment between the hub assembly 289 and the dropout 32*a* is provided through (i) the piloted and axially overlapping engagement between the skewer shaft 292 and central bore 291*a* and (ii) the axially overlapped threaded engagement between threaded end 293 and threaded hole 295 and (iii) the axially overlapped and radially nested engagement between the collar portion 297 and the slot 36*a* of dropout 32*a*.

It is noted that the embodiment of FIGS. 8*a-b* provides a representative example where radial alignment between the hub assembly and the dropout may be achieved through interaction of several different components. It is also noted that the threaded engagement between the threaded hole 295 and the threaded portion 293 extends axially inboard of the outboard face 40*a* of the dropout 32*a*. It is further noted that the internal threaded hole 295 of the alignment nut 294 is threaded completely through the alignment nut 294 as shown. This allows the threaded end 293 of the skewer shaft 292 to extend completely through the alignment nut 294 and even protrude through the opposite side as shown in FIG. 8*b*. This in contrast with the blind threaded hole 164 of the piloting nut 162 of FIGS. 3*a-h*, where the blind threaded hole 164 creates a depth limit for its threaded engagement with the skewer shaft 152.

Figure 9:
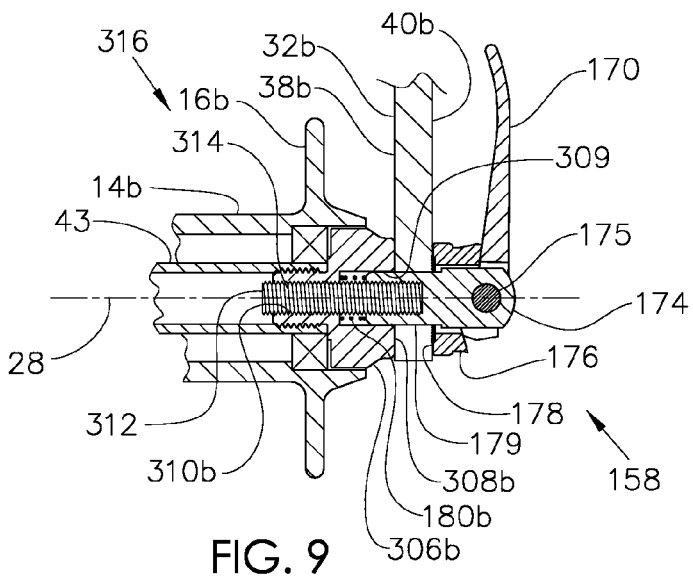
FIG. 9 is a partial axial cross-sectional view of a seventh embodiment of the present invention, showing the clamping assembly and skewer shaft anchored to the axle assembly.

FIG. 9 describes a still further alternate embodiment similar to the embodiment of FIGS. 3*a-h*, however the skewer shaft 312 does not extend between the two opposing gripping faces, but instead the skewer shaft 312 is axially engaged to the axle assembly. Dropout 32*b* is identical to that shown in FIGS. 3*a-h* and includes open slot 36*b* inboard face 38*b* and outboard face 40*b*. Hub assembly 316 is shown in fragmentary section view and is identical to the hub assembly 130 of FIGS. 3*a-h* with the exception of axle cap 306*b*, which includes outer face 308*b*, counterbore 309*b* and internally threaded bore 310*b*.

Clamping assembly 158 is identical to that of FIGS. 3*a-h* and includes a lever 170, pivot shaft 175, follower bushing 176 and an axially inboard facing gripping face 178. Pilot shaft 174 includes cylindrical collar portion 179 whose outside diameter is sized to provide radial positioning alignment with the dropout 32*b* when it is nested within slot 36*b* and the outside diameter of collar portion 179 is sized to provide a locating clearance fit with the counterbore 309*b*, such that when the collar portion 179 is axially overlapped and piloted with the counterbore 309*b* to provide radial positioning alignment with both the dropout 32*a* and the axlecap 306*b*. Skewer shaft 312 is threaded along its length with external threads 314 and pilot shaft 174 is threadably engaged locked to the skewer shaft 312 as shown. Skewer shaft 312 is also threadably engaged to the internally threaded bore 310*b* of axle cap 306*b*. Thus, the axial distance between the outer face 308 and gripping face 178 may be threadably adjusted via the threaded engagement between the skewer shaft 312 and the threaded bore 310*b* for proper positioning for optimized clamping of the dropout 32*b* via the axial camming of the clamping assembly 158 as previously described. In the embodiment of FIGS. 3*a-h*, the clamping assembly 158 serves to clamp both dropouts 32*a* and 32*b* simultaneously. In contrast, since the skewer shaft 312 is axially engaged to the axle cap 306*b*, the clamping assembly 158 only clamps the single dropout 32*b*. It is also noted that the threaded engagement between the skewer shaft 312 and the pilot shaft 174 extends axially inboard of the outboard face 40*b* of the dropout 32*b*. It is noted that the embodiment of FIG. 9 provides a representative example where the skewer shaft is axially engaged to the axle assembly.

It is noted that, in the embodiment of FIGS. 3*a-h*, the collar portion 165 is integral and monolithic with the head portion 163, which includes gripping face 168. In contrast, the embodiment of FIGS. 10*a-b* describes a yet further alternate embodiment that is identical to the embodiment of FIGS. 3*a-h*, with the exception that the piloting nut 162 is shown here as composed of two separate components: the clamp nut 324 and the collar sleeve 318. Dropout 32*a* is identical to that shown in FIGS. 3*a-h* and includes open slot 36*a* inboard face 38*a* and outboard face 40*a*. Hub assembly 130 is shown in fragmentary section view. Clamp nut 324 includes internally threaded hole 326, gripping face 328, and alignment face 330. Collar sleeve 318 includes outside surface 319, end faces 322*a* and 322*b*, and through bore 320, which is sized for a close clearance fit with the skewer shaft 152. Also included are skewer shaft 152 and spring 80*a*.

Figure 10A:
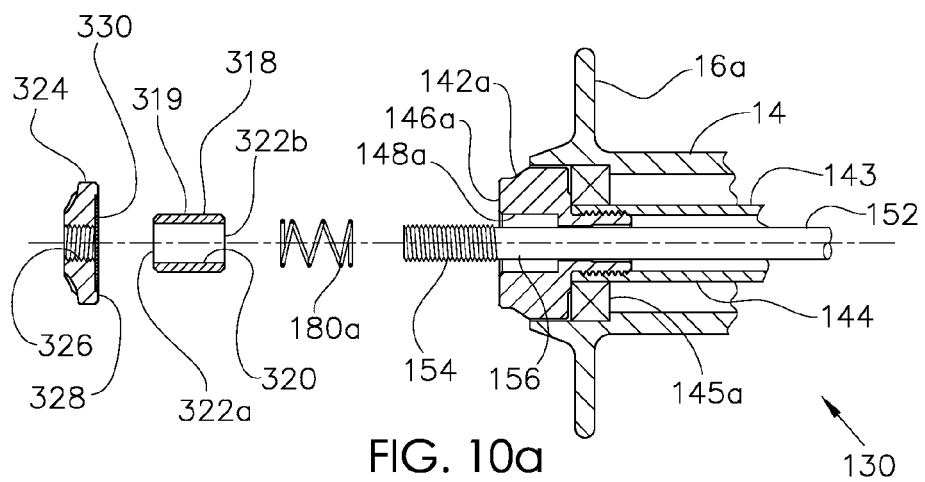
FIG. 10a is a partial axial cross-sectional exploded view of an eighth embodiment of the present invention, showing a two-piece piloting nut prior to assembly with the dropouts and hub assembly.

FIG. 10*a* shows the skewer shaft 152 assembled with the hub assembly 289 and shows the clamp nut 324 and collar sleeve 318 and spring 80*a* prior to threaded assembly between the clamp nut 324 and the skewer shaft 152. Spring 80*a* is first assembled and nested into counterbore 148*a*. Next, collar sleeve 318 is assembled into counterbore 148*a* such that the spring 80*a* is pressed against end face 322*b* to bias the collar sleeve axially outwardly. Then, the clamp nut 324 is threaded onto the skewer shaft 152, with threaded portion 154 threadably engaged to the threaded hole 326. End face 322*a* is now pressed and butted up against alignment face 330 (as shown in FIG. 10*b*).

Figure 10B:
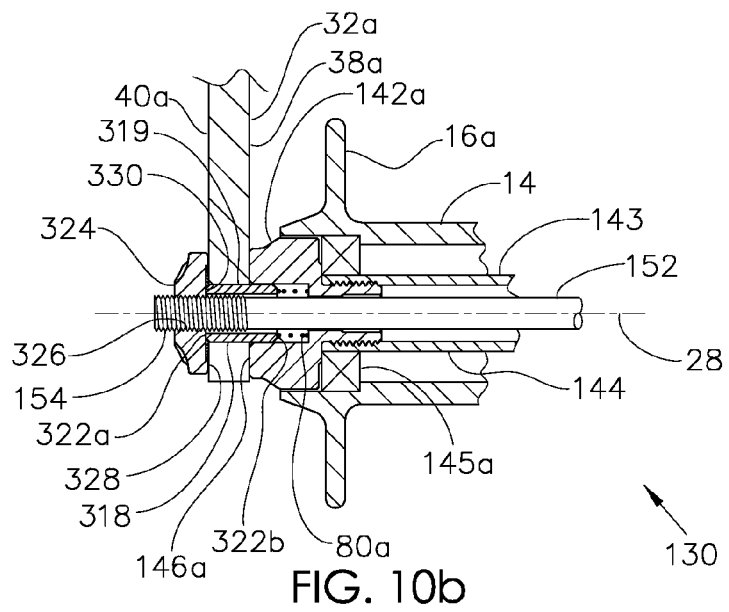
FIG. 10b is a partial axial cross-sectional view of the embodiment of FIG. 10a, showing a two-piece piloting nut as assembled with the dropouts and hub assembly.

As shown in FIG. 10*b*, the outside surface 319 is sized to provide radial positioning alignment with the dropout 32*a* when it is nested within slot 36*a*. In this respect, the collar sleeve functions much the same as axle stub 48*a* of FIGS. 2*a-h*. Further, the outside diameter of collar sleeve 318 is sized to provide a locating clearance fit with the counterbore 148*a*, such that when the collar sleeve 318 is axially overlapped and piloted with the counterbore 148*a*, the collar portion 165 may now provide radial positioning alignment with both the dropout 32*a* and the axlecap 142*a*. The dropout 32*a* is clamped and sandwiched between gripping face 328 and outer face 146*a* in a manner previously described.

In the embodiment of FIGS. 3*a-h* the collar portion 165 is shown to be integral and/or monolithic with the piloting nut 162 and with the threaded engagement associated with the threaded hole 164 extending to axially overlap with the collar portion 165. In contrast, the embodiment of FIGS. 10*a-b* shows a two-piece design where the clamp nut 324 and collar sleeve 318 are effectively combined to provide similar functionality to the piloting nut 162. Further, the collar sleeve 318 is shown to have a generally smooth through bore that does not have threaded engagement with the threaded portion 154 of the skewer shaft. It is also noted that the threaded engagement between the threaded hole 326 and the threaded portion 154 does not extend axially inboard of the outboard face 40*a* of the dropout 32*a*. It is further noted that the collar sleeve 318 may be independently rotated relative to the clamp nut 324 about the axial axis 28.

It is noted that the embodiment of FIGS. 10*a-b* provides a representative example where the axially clamping gripping face 328 is in a separate component from the radially locating collar sleeve 318. A wide range of alternate arrangements may be utilized. For example, the sleeve 318 may be rotationally keyed relative to the clamp nut 324 to provide a rotationally linked engagement between the two. Further, the collar sleeve 318 may be axially connected to the skewer shaft 152. Still further, the collar sleeve 318 may be axially connected to the clamp nut 324.

Figure 11A:
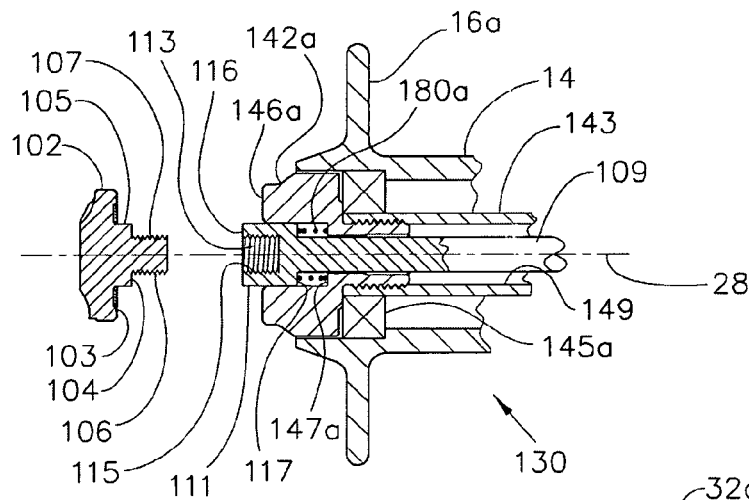
FIG. 11a is a partial axial cross-sectional exploded view of a ninth embodiment of the present invention, illustrating an externally threaded piloting nut and an internally threaded skewer shaft, shown prior to assembly with the dropouts and hub assembly.
Figure 11B:
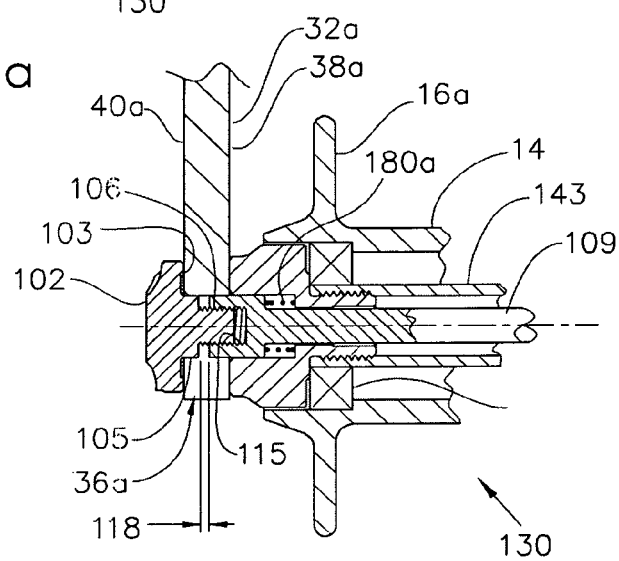
FIG. 11b is a partial axial cross-sectional view of the embodiment of FIG. 11a, showing the externally threaded piloting nut threadably engaged to the internally threaded skewer shaft, as assembled with the dropouts and hub assembly, with radially locating alignment of the dropout provided by both the piloting nut and the skewer shaft.

FIGS. 11*a-b* describe another alternate embodiment, similar to the embodiment of FIGS. 3*a-h*, that instead employs a piloting nut that includes an external surface (i.e. external threads 107) of the piloting nut 102 that engages an internal surface (i.e. internal threads 115) of the skewer shaft 109. As shown in FIG. 11*a*, piloting nut 102 includes gripping face 103, collar portion 105 with shoulder 104 and an externally threaded stub 106 with external threads 107. Skewer shaft 109 includes an enlarged collar portion 111, an end face 116, a shoulder 117, and an internally threaded hole 113 with internal threads 115. Hub assembly 130 is shown in fragmentary section view and is identical to the hub assembly of FIGS. 3*a-h* and rotatable about axial axis 28. Dropout 32*a*, as shown in FIG. 11*b*; is identical to that described in FIGS. 3*a-h*.

FIG. 11b corresponds with the sequence of FIG. 3h and shows the hub assembly 130, with piloting nut 102 and skewer shaft 109, as assembled and clamped to dropout 32a. The external threads 107 are threadably mated with internal threads 115 to join the piloting nut 102 to the skewer shaft 109. Note that there exists a gap 118 between the shoulder 104 and end face 116 which indicates that the axial location of the piloting nut 102 may be threadably adjusted relative to the skewer shaft 109 in a manner similar to that described previously in FIGS. 3a-h. It is also noted that collar portion 111 is cylindrical and of the same external diameter as collar portion 105, with both collar portions serving to simultaneously provide radial position alignment with the slot 36a of the dropout 32a in a manner described previously in FIGS. 3a-h. Further, collar portion 111 is shown to be piloted within counterbore 148a to provide radial position alignment between the skewer shaft 109 and the hub assembly 130. Spring 180a is located between shoulder 147a and shoulder 104 to bias the griping face 103 outwardly of the end face 146a. Thus, it may be seen that the skewer shaft 109 itself may include geometry to provide radial locating geometry with the hub assembly 130 and with the dropout 32a.

Figure 12:
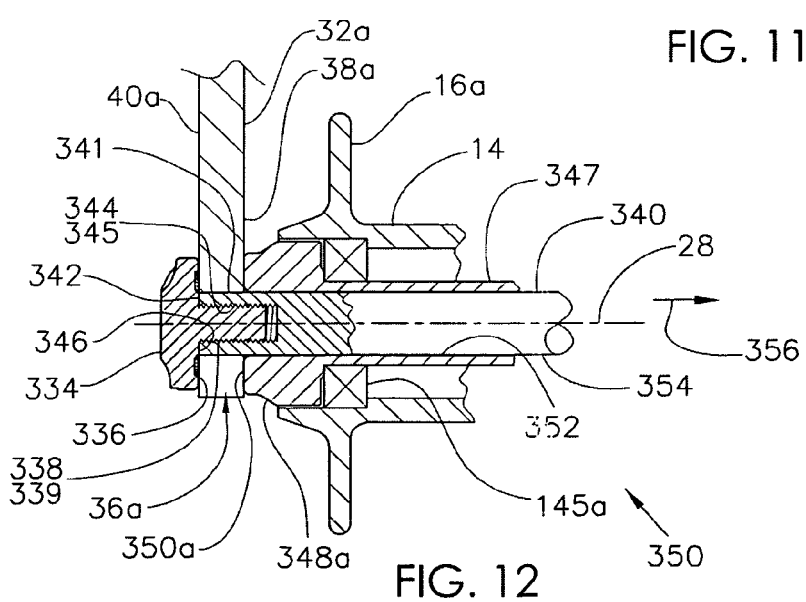
FIG. 12 is a partial axial cross-sectional view of a tenth embodiment of the present invention, showing the externally threaded piloting nut threadably engaged to an internally threaded skewer shaft, as assembled with the dropouts and hub assembly, with radially locating alignment of the dropout provided by the skewer shaft.

FIG. 12 describes another alternate embodiment, similar to the embodiment of FIGS. 11a-b, that instead shows the skewer shaft 340 as providing radial position alignment with the dropout and shows a non-adjustable threaded engagement between the gripping screw 334 and the skewer shaft 340. As shown in FIG. 12, gripping screw 334 includes gripping face 336 and an externally threaded stub 338 with external threads 339. Skewer shaft 340 has a generally straight cylindrical external surface 254, end face 342, and an internally threaded hole 344 with internal threads 345. Hub assembly 350 is shown in fragmentary section view and is similar to the hub assembly 130 of FIGS. 3a-h and includes hub shell 14, hub flange 16a, axle 347 with axle cap 348a, hole 352 and end face 350a. Hub shell 14 is rotatable about axle 347 and axial axis 28 via bearings 145a. Dropout 32a, as shown in FIG. 12, is identical to that described in FIGS. 3a-h.

FIG. 12 corresponds with the sequence of FIG. 3h and shows the hub assembly 350 as assembled and clamped to dropout 32a. Threaded stub 338 is first threaded into threaded hole 344, with external threads 339 threadably mated with internal threads 345, until end face 342 is bottomed out against base surface 346, thus axially locking the gripping screw 334 and skewer shaft 109. It is noted that alignment portion 341 is proud of the end face 350 and is utilized to provide radial positioning geometry with the slot 36a of the dropout 32a. Skewer shaft 340 is piloted and radially aligned within hole 352 of the axle 347, while also permitting axial sliding between the two. Thus, it is noted that the skewer shaft 340 in this embodiment serves to provide a similar function to the collar portion 165 of FIGS. 3a-h. As skewer shaft 340 is then drawn in direction 356 relative to axle 347 (by a means similar to that described in several other embodiments herein), the dropout 32a is sandwiched and gripped between gripping face 336 and end face 350a, thus securing the hub assembly 350 to the frame (not shown).

While the skewer shaft 340 is shown here to have a relatively constant cross section and straight cylindrical outer surface 354, in an alternative design the cross section and outer surface of the skewer shaft may be variable along the axial axis 28. For example, the skewer shaft may include a reduced external dimension to pilot within axle may and an enlarged external dimension for radial positioning location with the dropout 32a. In another alternative example, the skewer shaft may include an enlarged external dimension to pilot within axle may and a reduced external dimension for radial positioning location with the dropout 32a. In a further alternative example, the outer surface 354 may be non-circular to provide a rotationally keyed engagement with the hole 352 or the slot 36a.

While my above description contains many specificities, these should not be construed as limitations on the scope of the invention, but rather as exemplifications of embodiments thereof. For example:

The skewer shaft in most of these embodiments is shown to be a separate component that is assembled to the piloting nut and/or the clamping assembly. Alternatively, the skewer shaft may be integral or monolithic with the piloting nut or the clamping assembly.

The collar portions of the corresponding piloting nut and/or the clamping assembly are shown here to be of generally cylindrical for with circular outer cross-sectional perimeter. Alternatively, the collar portions of the corresponding piloting nut and/or the clamping assembly may have geometry with non-circular outer cross-sectional perimeter. For example, the cross-sectional perimeter may include flat portions to for non-rotational engagement with the dropouts.

Most of the embodiments show at least one threadably adjustable engagement between the skewer shaft and the piloting nut and/or the clamping assembly to control the axial spacing with opposing gripping faces of the quick release assembly. Alternatively, all of the piloting nut(s) and/or the clamping assembly(s) may be axially fixed to the skewer shaft, with no provision for threadable adjustment. In such a case, the axial spacing of opposing gripping faces may potentially have no adjustment and clamping would be solely achieved by expansion of a clamping assembly.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:
1. A quick release hub assembly, comprising:
a stationary axle element including an axial axis, a first outer face and a second outer face axially spaced and axially opposed to said first outer face, and including an opening therethrough that extends axially between said first outer face and said second outer face;
a rotatable hub shell element that is rotatable about said axle element;
a quick release skewer assembly including a first skewer element with a first gripping face, a second skewer element with a second gripping face, and a skewer shaft connecting said first skewer element and said second skewer element;
a frame element including first and second mounting portions thereof for mounting of said axle element;
wherein said first gripping face is axially opposed and facing said second gripping face;
wherein said first gripping face is axially outboard said first outer face and said second gripping face is axially outboard said second outer face;
wherein said quick release skewer assembly extends through said opening;
wherein said first skewer element is a discreet component from said skewer shaft;
wherein the axial distance between said first gripping face and said second gripping face is selectively variable;

wherein said first skewer element includes a first collar portion that extends axially inboard of said first gripping face;

wherein said first skewer element is connected to said skewer shaft by means of a connection at a connection location that is axially inboard of said first gripping face;

including an axial gap region between said first gripping face and said first outer face;

wherein said first collar portion includes a radially outboard peripheral surface within said axial gap region;

wherein said radial outboard peripheral surface is radially outboard relative to any other surface of said hub assembly within said axial gap region;

wherein said first collar portion extends axially inboard of said first outer face; and wherein said first mounting portion includes a first opening extending generally axially therethrough to receive said first collar portion in a generally radial direction, and wherein said first opening is an open slot.

2. A quick release hub assembly according to claim 1, including a frame element that includes first and second mounting portions for mounting of said axle element; wherein said first mounting portion is axially spaced from said second mounting portion; wherein said first and second mounting portions each include an axially inboard clamping face and an axially outboard clamping face; wherein said first mounting portion is positioned between said first gripping face and said first outer face and said second mounting portion is positioned between said second gripping face and said second outer face; wherein said quick release skewer assembly includes means to provide selective axial control wherein the axial distance between said first gripping face and said second gripping face is selectively controlled such that in a "closed" selective position, said first gripping face and said second gripping face are axially contracted and in an "open" selective position, said first gripping face and said second gripping face are axially expanded; and wherein in said "closed" selective position said first mounting portion is axially gripped between said first gripping face and said first outer face and said second mounting portion is axially gripped between said second gripping face and said second outer face; and wherein in said "open" selective position, said first mounting portion is axially released between said first gripping face and said first outer face and said second mounting portion is axially released between said second gripping face and said second outer face.

3. A quick release hub assembly according to claim 1, wherein said quick release skewer assembly includes means to provide selective axial control wherein the axial distance between said first gripping face and said second gripping face is selectively controlled such that in a "closed" selective position, said first inner face and said second inner face are axially contracted and in an "open" selective position, said first inner face and said second inner face are axially expanded.

4. A quick release hub assembly according to claim 3, wherein said means to provide selective axial control is a cam and follower engagement.

5. A quick release hub assembly according to claim 3, wherein said means to provide selective axial control is a threaded engagement.

6. A quick release hub assembly according to claim 1, wherein said second skewer element is connected to said skewer shaft by means of a second connection at a connection location that is axially inboard of said second gripping face.

7. A quick release hub assembly according to claim 6, wherein said second connection includes a threaded engagement.

8. A quick release hub assembly according to claim 1, wherein said connection between said first skewer element and said skewer shaft includes a longitudinal engagement therebetween that extends longitudinally over an axial distance and wherein at least a portion of said longitudinal engagement extends to a connection location that is axially inboard of said first gripping face.

9. A quick release hub assembly according to claim 8, wherein said longitudinal engagement is a threaded engagement.

10. A quick release hub assembly according to claim 9, wherein said quick release skewer assembly includes means to provide selective axial control wherein the axial distance between said first gripping face and said second gripping face is selectively controlled such that in a "closed" selective position, said first inner face and said second inner face are axially contracted and in an "open" selective position, said first inner face and said second inner face are axially expanded, and wherein said threaded engagement is functional to provide said selective axial control.

11. A quick release hub assembly according to claim 9, wherein said threaded engagement is an axially fixed threaded engagement.

12. A quick release hub assembly according to claim 10, wherein said threaded engagement comprises internal threads of said first skewer element threadably engaged to external threads of said skewer shaft.

13. A quick release hub assembly according to claim 12, wherein said internal threads extend within an axial opening that extends through said first skewer element.

14. A quick release hub assembly according to claim 12, wherein said internal threads extend in a blind hole of said first skewer element.

15. A quick release hub assembly according to claim 9, wherein said threaded engagement comprises external threads of said first skewer element threadably engaged to internal threads of said skewer shaft.

16. A quick release hub assembly according to claim 8, wherein said longitudinal engagement is a crimped or swaged engagement.

17. A quick release hub assembly according to claim 1, wherein said connection location is at least one of axially coincident and axially inboard of said first outer face.

18. A quick release hub assembly according to claim 1, wherein at least a portion of said first skewer element includes a configured surface to facilitate manual manipulation thereof, and wherein said configured surface is at least one of axially outboard of said first gripping face and radially outboard said collar portion.

19. A quick release hub assembly according to claim 1, wherein at least a portion of said skewer shaft has a cross sectional area between 10 and 35 square millimeters.

20. A quick release hub assembly according to claim 1, wherein said first outer face defines the axially outboard terminus of said axle element.

21. A quick release hub assembly according to claim 1, wherein said first collar portion is rotatable relative to said axle element about said axial axis.

22. A quick release hub assembly, comprising:
a stationary axle element including an axial axis, a first outer face and a second outer face axially spaced and axially opposed to said first outer face, and including an axially extending opening therethrough that extends axially between said first outer face and said second outer face;
a rotatable hub shell element that is rotatable about said axle element;
a quick release skewer assembly including a first skewer element with a first gripping face, a second skewer element with a second gripping face, and a skewer shaft connecting said first skewer element and said second skewer element;
a frame element including first and second mounting portions thereof for mounting of said axle element;
wherein said first mounting portion is axially spaced from said second mounting portion;
wherein said first and second mounting portions each include an axially inboard clamping face and an axially outboard clamping face;
wherein said first gripping face is axially opposed and facing said second gripping face;
wherein said first gripping face is axially outboard the said outboard clamping face of said first mounting portion and said second gripping face is axially outboard the said outboard clamping face of said second mounting portion;
wherein said quick release skewer assembly extends through said opening;
wherein the axial distance between said first gripping face and said second gripping face is selectively variable;
wherein said quick release skewer assembly includes a first collar portion that extends axially inboard of said first gripping face;
wherein said first collar portion includes locating geometry to provide radially positioning alignment with said first mounting portion; and
wherein said first mounting portion includes a first opening extending generally axially therethrough to receive said first collar portion in a generally radial direction, and wherein said first opening is an open slot.

23. A quick release hub assembly according to claim 22, wherein said first collar portion extends axially inboard of said first outer face.

24. A quick release hub assembly according to claim 22, including an axial gap region between said first gripping face and said first outer face, wherein said first collar portion includes a radially outboard peripheral surface within said axial gap region, and wherein said radial outboard peripheral surface is radially outboard relative to said any other surface of said hub assembly within said axial gap region.

25. A quick release hub assembly according to claim 22, wherein said quick release skewer assembly includes a second collar portion that extends axially inboard of said second gripping face and wherein said second collar portion includes locating geometry to provide a radially positioning alignment with said second mounting portion.

26. A quick release hub assembly according to claim 22, wherein said first collar portion has an axially fixed relation to said first gripping face.

27. A quick release hub assembly according to claim 22, wherein said first collar portion is axially displaceable relative to said first gripping face.

28. A quick release hub assembly according to claim 27, including means to selectively displace said first gripping face relative to said first collar portion.

29. A quick release hub assembly according to claim 28, wherein said means to selectively displace said first gripping face relative to said first collar portion is a cam and follower engagement.

30. A quick release hub assembly according to claim 22, wherein said first skewer element is connected to said skewer shaft by means of a connection therebetween and wherein said connection is an axially fixed connection.

31. A quick release hub assembly according to claim 22, wherein said first skewer element is selectively axially displaceable relative to said skewer shaft.

32. A quick release hub assembly according to claim 22, wherein said first collar portion is one of integral and monolithic with said first skewer element.

33. A quick release hub assembly according to claim 22, wherein said first collar portion is in a discreet element from said first skewer element.

34. A quick release hub assembly according to claim 22, wherein said quick release skewer assembly includes piloting geometry for radial alignment of said quick release skewer assembly relative to said axle element.

35. A quick release hub assembly according to claim 34, wherein said piloting geometry is located in said first skewer element.

36. A quick release hub assembly according to claim 34, wherein said piloting geometry is located in said skewer shaft.

37. A quick release hub assembly according to claim 22, wherein said collar portion is a circular cylindrical collar.

38. A quick release hub assembly according to claim 22, including a spring positioned between said axle element and said a quick release skewer assembly, wherein said spring serves to bias said first gripping face toward an axially distal orientation relative to said first outer face.

39. A quick release hub assembly according to claim 22, wherein at least a portion of said first skewer element includes a configured surface to facilitate manual manipulation thereof, and wherein said configured surface is at least one of axially outboard of said first gripping face and radially outboard said collar portion.

40. A quick release hub assembly according to claim 22, wherein at least a portion of said skewer shaft has a cross sectional area between 10 and 35 square millimeters.

41. A quick release hub assembly according to claim 22, wherein said first collar portion is in a component discrete from said skewer shaft.

42. A quick release hub assembly according to claim 22, wherein said quick release skewer assembly includes means to provide selective axial control wherein the axial distance between said first gripping face and said second gripping face is selectively controlled such that in a "closed" selective position, said first inner face and said second inner face are axially contracted and in an "open" selective position, said first inner face and said second inner face are axially expanded, and wherein in said "closed" selective position said first mounting portion is axially gripped between said first gripping face and said first outer face and said second mounting portion is axially gripped between said second gripping face and said second outer face; and wherein in an "open" selective position, said first mounting portion is axially released between said first gripping face and said first outer face and said second mounting portion is axially released between said second gripping face and said second outer face.

43. A quick release hub assembly according to claim 22, wherein said first skewer element is connected to said skewer shaft by means of a threadable connection therebetween, and wherein said threadable connection provides means to selectively axially displace said first gripping face relative to said second gripping face.

44. A quick release hub assembly according to claim 22, wherein said open slot is sized such that said first collar portion may be passed radially therethrough.

45. A quick release hub assembly according to claim 22, wherein said first opening receives said first skewer element in a generally radial direction during assembly therebetween.

46. A quick release hub assembly, comprising:
- a stationary axle element including an axial axis, a first outer face and a second outer face axially spaced and axially opposed to said first outer face, and including an axially extending opening therethrough that extends axially between said first outer face and said second outer face;
- a rotatable hub shell element that is rotatable about said axle element;
- a quick release skewer assembly including a first skewer element with a first gripping face, a second skewer element with a second gripping face, and a skewer shaft connecting said first skewer element and said second skewer element;
- a frame element including first and second mounting portions thereof for mounting of said axle element;
- wherein said first mounting portion is axially spaced from said second mounting portion;
- wherein said first and second mounting portions each include an axially inboard clamping face and an axially outboard clamping face;
- wherein said first gripping face is axially opposed and facing said second gripping face;
- wherein said first gripping face is axially outboard said outboard clamping face of said first mounting portion and said second gripping face is axially outboard said outboard clamping face of said second mounting portion;
- wherein said quick release skewer assembly extends through said opening;
- wherein the axial distance between said first gripping face and said second gripping face is selectively variable;
- wherein said quick release skewer assembly includes a first collar portion that extends axially inboard of said first gripping face;
- wherein said first collar portion includes locating geometry to provide radially positioning alignment with said first mounting portion;
- wherein said first mounting portion includes a first opening extending generally axially therethrough to receive said first collar portion in a generally radial direction, and wherein said first opening is an open slot;
- wherein said first collar portion extends to axially overlap said opening of said axle element; and
- wherein said first collar portion extends axially inboard of said first outer face.

* * * * *